(12) United States Patent
Bashford et al.

(10) Patent No.: US 10,261,602 B2
(45) Date of Patent: Apr. 16, 2019

(54) HOP NAVIGATION

(71) Applicant: Google LLC, Mountain View, CA (US)

(72) Inventors: Ben Bashford, Ramsgate (GB); Miroslav Bojic, London (GB); Matt Webb, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/447,060

(22) Filed: Mar. 1, 2017

(65) Prior Publication Data
US 2018/0253160 A1 Sep. 6, 2018

(51) Int. Cl.
*G09G 5/00* (2006.01)
*G06F 3/0346* (2013.01)

(52) U.S. Cl.
CPC .................. *G06F 3/0346* (2013.01)

(58) Field of Classification Search
USPC ....... 345/156, 157, 158, 173, 174, 179, 419, 345/169; 715/765
See application file for complete search history.

(56) References Cited

U.S. PATENT DOCUMENTS

| | | | |
|---|---|---|---|
| 6,624,824 B1 * | 9/2003 | Tognazzini | G06F 1/1626 345/169 |
| 7,697,750 B2 * | 4/2010 | Simmons | G02B 27/46 345/419 |
| 7,764,269 B2 | 7/2010 | Sohn et al. | |
| 8,418,083 B1 | 4/2013 | Lundy et al. | |
| 8,717,283 B1 | 5/2014 | Lundy et al. | |
| 9,075,436 B1 | 7/2015 | Kom et al. | |
| 2010/0253620 A1 * | 10/2010 | Singhal | G06F 3/0488 345/157 |
| 2013/0111384 A1 * | 5/2013 | Kim | G06F 3/048 715/765 |
| 2014/0347275 A1 * | 11/2014 | Kim | G06F 3/0346 345/158 |

(Continued)

OTHER PUBLICATIONS

H.W. Bristow et al., "Minimal Interaction for Mobile Tourism Computers", Proceedings of the 4th International Symposium on Human Computer Interaction with Mobile Devices, Sep. 18, 2002.

(Continued)

*Primary Examiner* — Thuy N Pardo
(74) *Attorney, Agent, or Firm* — McDonnell Boehnen Hulbert & Berghoff LLP

(57) ABSTRACT

Apparatus and methods related to hop navigation on mobile devices are provided. A computing device can generate a first visible display displaying a first screen. The computing device can receive a request to activate movement between screens. After receiving the request to activate movement between screens, the computing device can: generate a second visible display of an expanded screen plane, where the second visible display includes a display of the first screen and at least a portion of a neighboring screen within the expanded screen plane, enable interaction with the expanded screen plane using one or more movements of the computing device to navigate to the neighboring screen, and receive a request to deactivate movement between screens. After receiving the request to deactivate movement between screens, the computing device can generate a third visible display displaying the neighboring screen.

20 Claims, 11 Drawing Sheets

(56) References Cited

U.S. PATENT DOCUMENTS

2015/0160693 A1\* 6/2015 Stotler .................... G06F 1/163
  345/173
2015/0286267 A1\* 10/2015 Yang ..................... G06F 1/3262
  345/174

OTHER PUBLICATIONS

A. Chaturvedi, "Accelerometer Supported Tilt as an Input Method for Mobile Devices", Apr. 16, 2003.
P. Halbirk, "T-Mobile Ameo", Absolute Gadget, Aug. 12, 2007.
J. Kejriwal, "Mobile Technology Group", Sep. 29, 2006.
I. Oakley et al., "Tilt to Scroll: Evaluating a Motion Based Vibrotactile Mobile Interface", Proceedings of the First Joint Eurohaptics Conference and Symposium on Haptic Interfaces for Virtual Environment and Teleoperator Systems, Mar. 18, 2005.
D. J. Wigdor, "Chording and Tilting for Rapid, Unambiguous Text Entry to Mobile Phones", Master's Thesis, University of Toronto, 2004.

\* cited by examiner

HOP NAVIGATION

BACKGROUND

Many modern computing devices, including mobile phones, personal computers, and tablets, provide graphical user interfaces (GUIs) for permitting users to interact with the computing device. For example, application programs can use the GUI to communicate with a user using images, text, and graphical elements such as windows, dialogs, pop-ups, images, buttons, scrollbars, and icons. The GUI can also receive inputs from user-interface devices such as touch screens, computer mice, keyboards, and other user-interface devices to permit the user to control the GUI, and thus the application program.

In some cases, the GUI can be used to interact with an operating system (OS) to manage the computing device. For example, the OS can have a control panel or setting application that uses the GUI to draw one or more windows related to control settings for some aspect(s) of the computing device, such as audio controls, video outputs, computer memory, and human language(s) used by the OS (e.g., choose to receive information in English, French, Mandarin, Hindi, Russian, etc.). The control panel/settings application can receive subsequent input related to the window(s) using the GUI. The GUI can provide the inputs to the OS, via the control panel/settings application, to manage the computing device.

SUMMARY

In one aspect, a method is provided. A computing device generates a first visible display. The computing device receives a request to activate movement between screens. After receiving the request to activate movement between screens, the computing device: generates a second visible display of an expanded screen plane, where the second visible display includes a display of the first screen and at least a portion of a neighboring screen within the expanded screen plane; enables interaction with the expanded screen plane using one or more movements of the computing device to navigate to the neighboring screen; and receives a request to deactivate movement between screens. After receiving the request to deactivate movement between screens, the computing device generates a third visible display displaying the neighboring screen.

In another aspect, a computing device is provided. The computing device includes one or more processors; and data storage including at least computer-executable instructions stored thereon that, when executed by the one or more processors, cause the computing device to perform functions. The functions include: generating a first visible display displaying a first screen; receiving a request to activate movement between screens; after receiving the request to activate movement between screens: generating a second visible display of an expanded screen plane, where the second visible display includes a display of the first screen and at least a portion of a neighboring screen within the expanded screen plane, enabling interaction with the expanded screen plane using one or more movements of the computing device to navigate to the neighboring screen, and receiving a request to deactivate movement between screens; and after receiving the request to deactivate movement between screens, generating a third visible display displaying the neighboring screen.

In another aspect, a computer readable medium is provided. The computer readable medium has stored thereon instructions, that when executed by one or more processors of a computing device, cause the computing device to perform functions. The functions include: generating a first visible display displaying a first screen; receiving a request to activate movement between screens; after receiving the request to activate movement between screens: generating a second visible display of an expanded screen plane, where the second visible display includes a display of the first screen and at least a portion of a neighboring screen within the expanded screen plane, enabling interaction with the expanded screen plane using one or more movements of the computing device to navigate to the neighboring screen, and receiving a request to deactivate movement between screens; and after receiving the request to deactivate movement between screens, generating a third visible display displaying the neighboring screen.

In another aspect, a computing device is provided. The computing device includes: means for generating a first visible display displaying a first screen; means for receiving a request to activate movement between screens; means for, after receiving the request to activate movement between screens: generating a second visible display of an expanded screen plane, where the second visible display includes a display of the first screen and at least a portion of a neighboring screen within the expanded screen plane, enabling interaction with the expanded screen plane using one or more movements of the computing device to navigate to the neighboring screen, and receiving a request to deactivate movement between screens; and means for, after receiving the request to deactivate movement between screens, generating a third visible display displaying the neighboring screen.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Techniques for Hop Navigation

Figure 1:
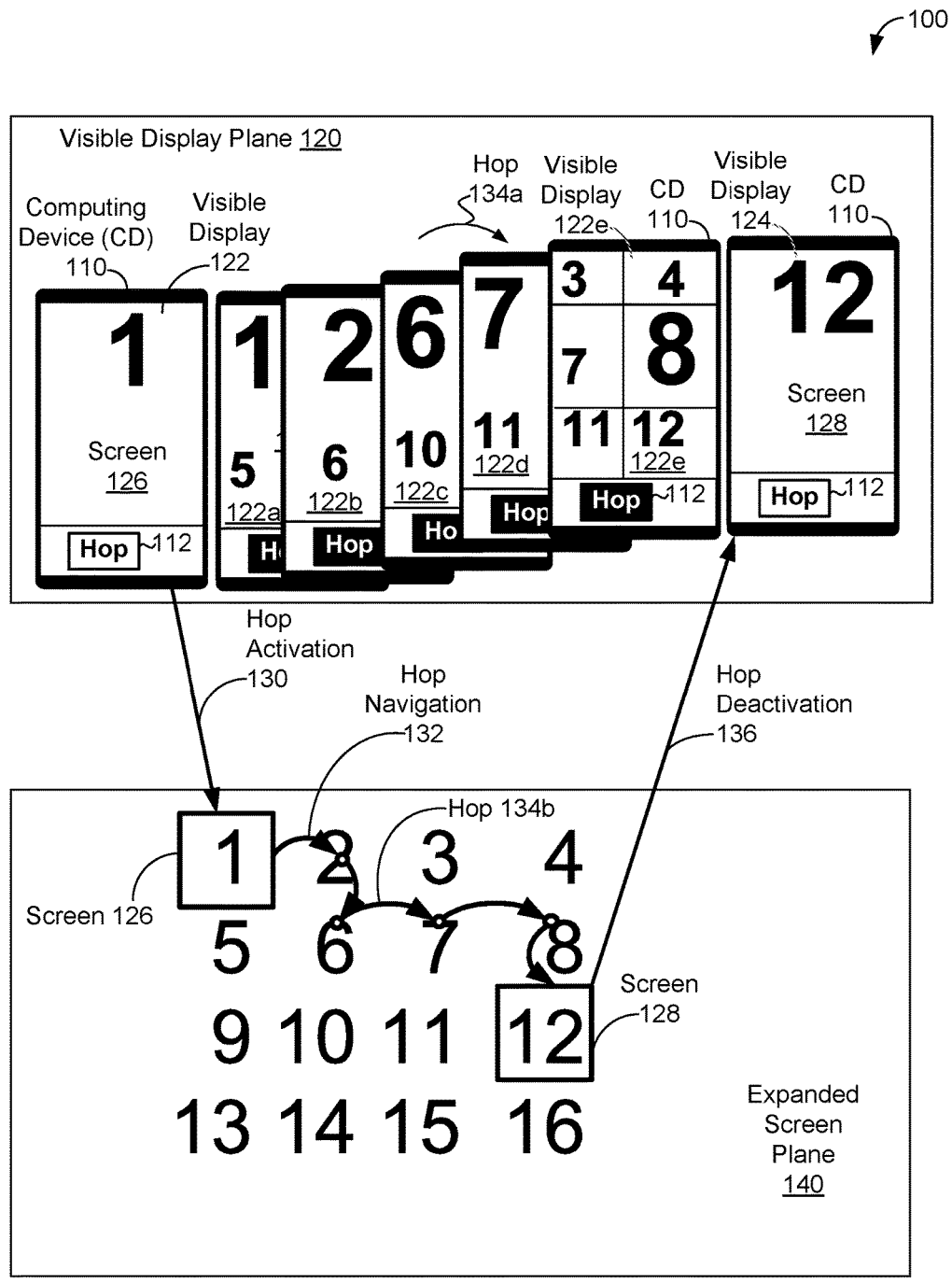
FIG. 1 shows a scenario where hop navigation is used by a computing device to navigate between screens within an expanded screen plane, in accordance with an example embodiment.

For many mobile devices, including larger devices, screen size and touch interaction can limit how much of a GUI can be displayed at once. As result, a GUI can support virtual screens; that is, the GUI can provide support for interaction on multiple screens. One technique for simplifying interaction with a mobile device with multiple screens is to arrange screens on a virtual two-dimensional (2D) expanded screen plane. In some examples, relationships between screens can be based on each screen's location in the expanded screen plane. In some embodiments, navigating between screens can include using the GUI to scroll through screens. In other implementations, screen navigation can involve using the GUI for pinching open and pinching close to respectively zoom in and zoom out of one or more screens. But, both scrolling through screens and zooming in and out can involve multiple touch-screen touches (or equivalent actions on devices without touch screens). However, having a GUI that uses scrolling or pinching to maintain relationships while navigating or moving between screens on the expanded screen plane can lead to continuity and location issues.

The herein-described procedures for hop navigation enable quick and natural movement between screens while preserving relations between locations of screens. For example, to maintain continuity, a hop-navigation-enabled GUI can provide support for hop navigation to move between spatially-distant screens in (nearly) the same amount of time as used in movements between spatially-adjacent screens. These hop navigation procedures can involve using a mobile device for: (1) activation of hop navigation while viewing a first visible display showing a first screen, (2) movement within an expanded screen plane of screens from the first screen to a second screen, and (3) deactivation of hop navigation to show a second visible display of a second screen—that is, the GUI "hops" from the first screen to the second screen.

In some embodiments, hop navigation can be activated by pressing a hop navigation button on a touch screen (or other input device) of the mobile device. For example, the hop-activation button can be a physical button (e.g. a button placed on a side, front or back of the device, a button on a keyboard) and/or a virtual button displayed on a touch screen. Then, hop navigation can remain active as long as the hop navigation button is depressed or until the hop navigation button is pressed again (e.g., the hop navigation button can act as a toggle). As another example, hop activation can be carried out via voice commands; e.g., "Start hop navigation", "Stop hop navigation". Other techniques for activating hop navigations are possible.

Once hop navigation is activated, a pre-activation view of a current screen can zoom out, enabling view of the current screen within the expanded screen plane of screens. At this point, the GUI can show a reduced display of the current screen in the middle of the view of the expanded screen plane; e.g., the reduced display can be about 70% of the pre-activation view. The reduced display can be surrounded by visible portions of other screens that neighbor and/or are otherwise spatially close to the current screen in the expanded screen plane.

As one example, movement/navigation among the expanded screen plane can be based on movements of the mobile device. That is, if the mobile device is moved left (or right), a display of the expanded screen plane can be navigated left (or right) along the expanded screen plane. Further, if the mobile device is moved up (or down) a display of the expanded screen plane can be navigated up (or down) in the expanded screen plane. Also, movement in a diagonal direction can lead to navigation of a display of the expanded screen plane in the diagonal direction. In some examples, three degrees of freedom in movement of the mobile device can be supported; e.g., mobile device movement inward (or outward) can lead to inward (or outward) navigation of the display of the expanded screen plane.

As another example, movement among the expanded screen plane can be based tilting the mobile device. For example, while hop navigation is activated, the mobile device have one or more tilt sensors that can detect "tilts" or vertical and/or horizontal movements of the mobile device. Example tilt sensors include, but are not limited to, mercury switches, rolling ball sensors, accelerometers, and gyroscopes. A tilt sensor can provide information about a tilt such as a tilt direction (e.g., up, down, left, right) and a tilt angle. Then, a computing device can determine that a tilt has occurred in the tilt direction when a tilt angle or other measure of device movement provided by a tilt sensor exceeds a threshold; e.g., when the tilt angle exceeds 10°, 15°, or another threshold value.

The tilt sensor(s) can determine a tilt angle representing how much the mobile device has been tilted in relative terms; e.g., by taking a difference between an initial tilt and a final tilt of a mobile device, or with respect to a reference set of axes; e.g., by determining a position of the mobile device with respect to the reference set of axes, such as a set of axes based on a gravity vector used a downward reference vector. In some examples, tilt sensors can recognize tilting along a horizontal (X) axis solely and/or a vertical (Y) axis solely; that is, a tilt sensor may be configured to screen out diagonal tilts. In other examples, tilt sensors can be normalized to recognize tilting along the X axis solely, the Y axis solely, or a depth (Z) axis solely to allow for three degrees of freedom in tilting the mobile devices. In still other examples, computing device 110 can include multiple tilt sensors; e.g., an X axis tilt sensor a Y axis tilt sensor, and Z axis tilt sensor, which respectively are for providing data, such as tilt angle values, about tilts associated with the respective X axis, Y axis, and Z axis. A rate of tilt can be determined using a tilt angle value; e.g., the rate of tilt can equal or otherwise be based on the tilt angle, or the rate of tilt determined using a change in tilt angles; e.g., the rate of tilt can equal or otherwise be based on a derivative of the tilt angle.

Regarding horizontal axis movement, when the mobile device is tilted to the left (or right), the GUI can show rightward (or leftward) movement in the expanded screen plane. Regarding vertical axis movement, when the mobile device is tilted up (or down), the GUI can show downward (or upward) movement in the expanded screen plane. This type of movement can have the effect of moving along the plane in the tilt direction; e.g., by tilting left, a viewer/user of the GUI can reach a screen to the left of the current screen. In some examples, navigation within the expanded screen plane can be based on an angle of tilt; e.g., the same angle of tilt along either the horizontal or vertical axis can enable navigation along the plane by the same amount and increasing (or decreasing) the angle of tilt can speed (or slow) navigation along the plane. As such, the GUI can navigate throughout the expanded screen plane quickly or slowly, depending on the rate of tilt.

By tilting the mobile device left, right, up, and down, the GUI can access the entirety of the expanded screen plane, including traversing screens. In some examples, once a new/different screen than a current screen is reached, the new/different screen can snap to a center of a visible display. Then, a user can continue to tilt to keep moving throughout the expanded screen plane between screens. Then, as a new screen is reached, the new screen can be "centered" or moved to a central portion of the visible display.

Once the GUI has been used to locate a desired screen within the expanded screen plane, hop navigation can be deactivated to complete navigation to the desired screen. For example, the hop navigation button mentioned above as being held down can be released to deactivate hop navigation. As another example, a hop navigation button can be toggled to a deactivated state to deactivate hop navigation. Once hop navigation is deactivated, the GUI can zoom in to display the desired screen as a visible display, and allow interaction with the desired screen. In some embodiments, some interaction aspects, such as pressing the hop activation button, releasing the hop activation button, and centering a screen, can lead to visual, audible, and/or haptic feedback from the mobile device to ease use of hop navigation.

More generally, hop navigation can be conceptualized as moving from a local screen represented by a visible display to an expanded screen plane representing a plane of software applications (or applications, for short), data, and related information, where the expanded screen plane includes the visible display. In some examples, the expanded screen plane can be a 2D plane as mentioned above; in other examples, an expanded screen plane can have more or fewer dimensions than two; e.g., the expanded screen plane can be a one-dimensional (1D) group of screens or a three-dimensional (3D) group of 2D screen planes.

For example, suppose a GUI of a mobile device generates a visible display VD1 as a display of a messaging software application. This visible display VD1 can be thought as being part of an expanded screen plane P1 of screens that includes: a current screen representing the display of the executing messaging application, related screens that include information about the person or persons communicating using the messaging application (e.g., contact information, data about previous interactions with the person(s)), topical screens about topics discussed using the messaging application, screens for other applications (e.g., a phone application, web browser, etc.) than the messaging application, and other screens. In this example, visible display VD1 can be considered as a local screen and expanded screen plane P1 can be considered as the expanded screen plane. By activating hop navigation, a user interacting with the mobile device can navigate from the local screen to the expanded screen plane, navigate within the expanded screen plane, and then return to the local screen by deactivating hop navigation. In some examples, multiple expanded screen planes can be used and navigated via hop navigation; e.g., a network, hierarchy, or other organization of expanded screen planes. In these examples, hop navigation can be used to navigate between expanded screen planes as well.

In some examples, hop navigation can be used to provide gesture-oriented interaction with a mobile device. For example, certain tilt directions can be associated with specific interactions. Suppose that hop navigation is activated while interacting with mobile device executing a messaging application. While hop navigation is activated for the messaging application, an upward tilt can be associated with launching a query (e.g., invoking a search engine via a web browser), a downward tilt can involve locating data, such as pictures and/or text, previously sent by one or more persons communicating using the messaging application, a leftward tilt can involve reviewing a previous conversation with some or all of the persons communicating using the messaging application, and a rightward tilt can involve looking up contact information for some or all of the persons communicating using the messaging application. In some examples, the specific interactions can be customized by a user; e.g., the user can specify that the upward tilt is used to look up contact information rather than the rightward tilt. Many other examples of gesture-oriented interactions are possible as well.

Hop navigation can provide simple, effective, and intuitive interaction techniques for utilizing mobile phones. These techniques can provide easy and quick movement among screens, and provide gesture-oriented navigation that enhances uses of mobile devices, thereby making mobile devices easier and more effective to use.

Techniques for Hop Navigation

FIG. 1 shows scenario 100 where hop navigation is used by computing device 110 to navigate between screens within expanded screen plane 140, in accordance with an example embodiment. Hop navigation techniques can conceptually enable computing device 110 to navigate between visible display plane 120 and expanded screen plane 140. In visible display plane 120, a computing device can generate a display having a screen, such as screen 126 showing a "1" of visible display 122. In expanded screen plane 140, multiple screens are available for display. In the example shown in FIG. 1, expanded screen plane 140 includes screens numbered 1 through 16 arranged in a 4×4 grid, where each screen is available for display. In some examples, expanded screen plane 140 can be a 1D, 2D, 3D, or other dimensional region that represents multiple screens. The screens in expanded screen plane 140 can be screens available to computing device 110; e.g., screen generated by software applications executed/executable by computing device 110, screens of still and/or video images, screens associated with messaging sessions (e.g., records of text or video messaging sessions), screens that represent portions of an underlying data item (e.g., such as a map or floorplan) screens associated with webpages, screens of data, and/or other screens displayable by computing device 110.

In scenario 100, hop navigation button 112 is displayed by computing device 110. Hop navigation button 112 either has a black background when hop navigation is activated or a white background when hop navigation is deactivated. Initially in scenario 100, hop navigation is deactivated and hop navigation button 112 initially has a white background.

Scenario 100 continues with hop navigation button 112 being pressed to cause hop navigation 132 to be activated, as illustrated by hop activation arrow 130. Upon hop navigation activation, the background of hop navigation button 112 changes to black to visually indicate that hop navigation is now active.

In scenario 100 and other scenarios described herein, hop navigation can activated by pressing a hop navigation button; e.g., hop navigation button 112 displayed by computing device 110 and deactivated by releasing the hop navigation button. In other scenarios, hop navigation can be activated/deactivated using a toggling hop navigation button; i.e., the toggling hop navigation button can be pressed once to activate hop navigation and pressed again to deactivate to activate hop navigation, by use of a hardware button, by voice command(s), or by moving computing device 110 (e.g., by tilting computing device 110 quickly up and down several (e.g., 3, 5, 6) times to activate/deactivate hop navigation). Other techniques to activate/deactivate hop navigation are possible as well.

Once activated, hop navigation 132 enables computing device 110 to navigate, or move, between screens of expanded screen plane 140 by "hopping" or moving between screens one at a time. In other scenarios, the background of hop navigation button 112 does not change based on hop navigation activation status.

Upon activation of hop navigation 132, visible display 122a is generated by computing device 110. Visible display 122a includes a decreased size version of prior screen "1" and display of at least a portion of one or more neighboring screen(s), such as screen "5". Visible display 122a shows screen "1" above screen "5", as screen "1" is a neighboring screen above screen "5" in expanded screen plane 140.

Visible displays 122a, 122b, 122c, 122d, and 122e illustrate that, while performing hop navigation, each display can show a primary screen centered (or otherwise obviously featured) within the display and one or more neighboring screens. A primary screen displayed at some time T can be a screen that would be displayed if hop navigation were deactivated at time T. For example, visible display 122e shows screen "8" as occupying the center of and having a larger size within the display, indicating that screen "8" is the primary screen of visible display 122e. Visible display 122e also shows portions of screens "3", "4", "7", "11", and "12", which are screens than neighbor primary screen "8" within expanded screen plane 140.

Each hop can be made in response to a motion of computing device 110. One type of motion that can be used to generate hops is tilting computing device 110; i.e., leaning computing device 110 in a particular direction. For example, if computing device 110 is tilted downward while displaying screen "1" as a primary screen as shown in display 122a, then computing device 110 can display one screen below (or downward from) screen "1" in expanded screen plane 140 as a primary screen; that is, display screen "5" as a primary screen. As another example, if computing device 110 is tilted rightward while displaying screen "1", then computing device can display one screen to the right of screen "1" within expanded screen plane 140 as a primary screen; that is, display screen "2" as a primary screen.

Another type of motion that can be used to generate hops are sliding movements or "slides" of computing device 110; e.g., the hop from screen "1" to screen "5" mentioned above can be made in response to a downward slide of computing device 110, and the hop from screen "1" to screen "2" also mentioned above can be made in response to a rightward slide of computing device 110. Other examples of tilts, slides, and/or other motions of computing device 110 and related hops are possible as well; e.g., as discussed below in the context of FIG. 2A and 2B.

In scenario 100, hops shown as hop navigation 132 are generated by tilting computing device 110 to navigate within expanded screen plane 140. FIG. 1 shows that hop navigation 132 of scenario 100 involves successive primary screen movement from screen "1" as shown in display 122a,", to screen "2", screen "6", screen "7", screen "8", and screen "12". Each of screens "2", "6", "7", and "8" is displayed as a primary screen in respective visible displays 122b, 122c, 122d, and 122e. Visible displays 122b, 122c, 122d, and 122e also show one or more neighboring screens. For example, visible display 122b shows the "2" screen as well as a portion of the "6" screen that neighbors and is immediately below the "2" screen in expanded display plane 140. As another example, visible display 122e shows the "8" screen as well as portions of neighboring screens "3", "4", "7", "11", and "12", which are screen "8"'s neighbors in expanded display plane 140.

Each of visible displays 122b, 122c, 122d, 122e, and 124 can be generated as a result of respective hops during hop navigation 132. For example, to perform hop 134a in visible display plane 120, computing device can be tilted rightward while generating visible display 122c to navigate from the "6" screen to the "7" screen in expanded screen plane as shown by hop 134b. Upon completion of hop 134a/hop 134b, computing device 110 can generate visible display 122d based on the "7" screen, as the "7" screen is the destination of hop 134b in expanded display plane 140.

In some embodiments, computing device 110 can include haptic device configured to provide vibrations and/or other haptic outputs. Then, haptic feedback can be provided during hop navigation 132. For example, at the end of each hop completed during hop navigation 132, the haptic device of computing device 110 can provide haptic feedback, such as a (brief) vibration, to indicate that a hop has been completed. Then, if X hops (X>0) are made during haptic navigation, computing device 110 can generate X (brief) vibrations as haptic feedback for the X hops. As another example, haptic feedback can be provided when hop navigation button 112 is used for hop activation 130 and/or when hop navigation button 112 is used for hop deactivation 136. Other examples of haptic feedback related to hop navigation are possible as well.

In scenario 100, computing device 110 is tilted rightward and downward during hop navigation 132 to navigate from screen "1" to screen "12" of expanded display plane 140. Upon reaching screen "12", scenario 100 continues with hop navigation button 112 being released to cause hop navigation 132 to be deactivated, as illustrated by hop activation arrow 136. While hop navigation is deactivated, computing device 110 stays within visible display plane 120.

Upon completion of hop deactivation 132, visible display 124 is generated by computing device 110. In visible display 124, screen "12" is displayed using the entirety of screen 128 (i.e., screen "12" is larger than a primary screen shown during hop navigation 132). Also, hop navigation button 112 is displayed with a white background as hop navigation is now deactivated. Once visible display 124 is generated and displayed by computing device 110, scenario 100 can be completed.

In other examples, one or more hops performed during hop navigation and/or displays accessed during hop navigation can be used to add more screens to visible display plane 120 and/or expanded screen plane 140. For example, consider a messaging application where one or more screens accessed during hop navigation and/or one or more of the hops performed during hop navigation can initiate one or more new messaging sessions. Then, each of the one or more new messaging sessions can be displayable as a visible display in visible display plane 120 and added to expanded screen plane 140.

Later uses of hop navigation could indicate that an expanded screen plane includes one or more screens for the one or more new messaging sessions. That is, suppose expanded screen plane 140 initially had n screens, and one new messaging session was initiated during hop navigation. Then, after a screen for the new messaging session is created, the created screen can be added to expanded screen plane 140, which would then have n+1 screens. In some examples, addition of a screen S1 to an expanded screen plane already having n screens can cause deletion of another screen S2 from the expanded screen plane; that is, screen S2 can be "recycled" to allow addition of screen S1 to an expanded screen plane that has, at most, n screens. Screen S2 of the expanded screen plane can be recycled according to one or more heuristics, such as, but not limited to, a least recently used (LRU) heuristic, a least frequently used (LFU) heuristic, a first-in-first-out (FIFO) heuristic, and/or a random replacement heuristic.

Figure 2A:
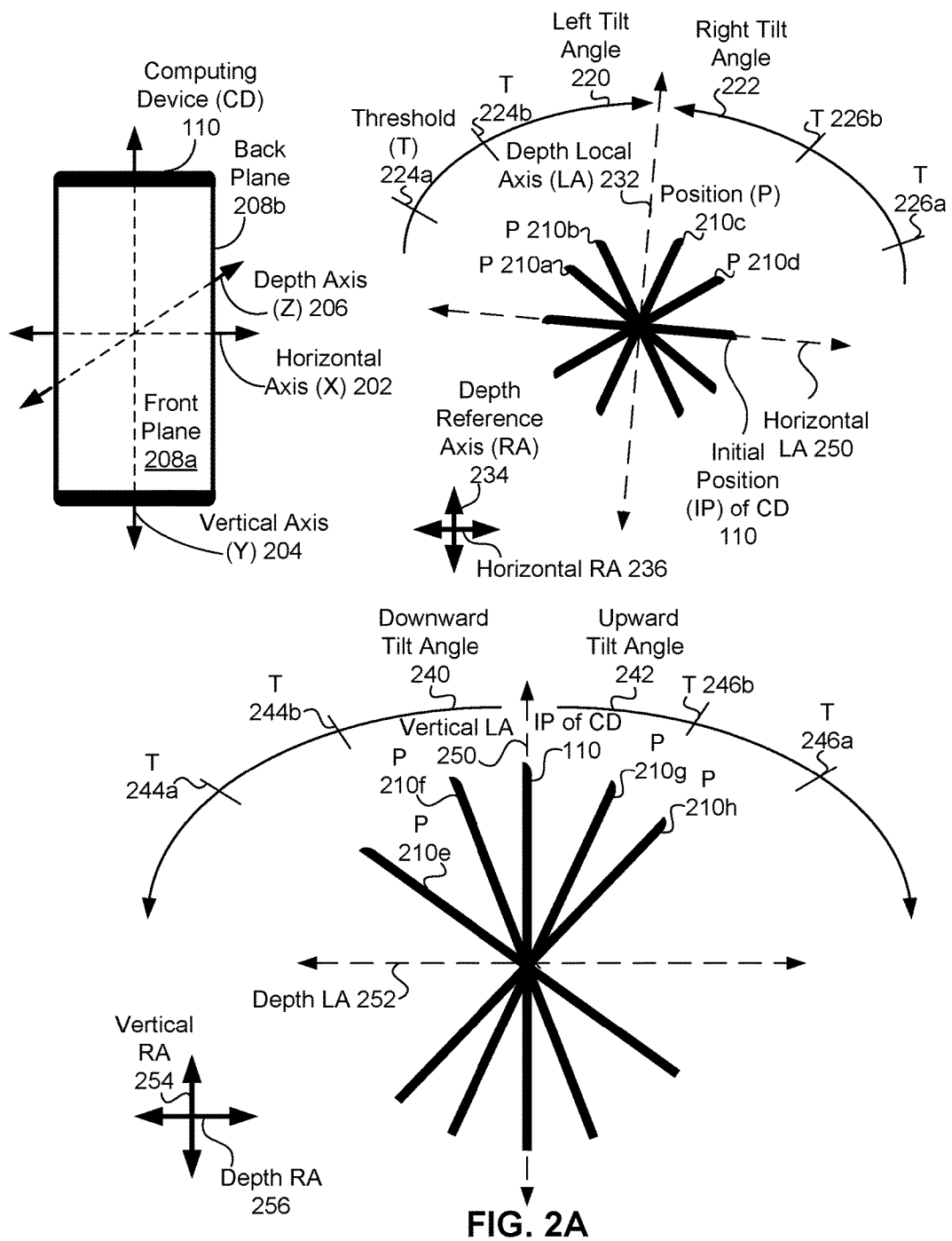
FIGS. 2A and 2B show example tilts of a computing device, in accordance with an example embodiment.

FIG. 2A shows example tilts of computing device 110, in accordance with an example embodiment. A tilt of computing device 110 can be classified as an upward tilt, a downward tilt, a left tilt, a right tilt, or a combination thereof; e.g., an upper-left tilt. In some examples, tilts can be normalized so that only left, right, upward, and downward tilts are utilized by computing device 110.

Tilt directions can be determined based on data provided by one or more tilt sensors, where the data can include one or more tilt angle values indicating an amount of tilt in one or more dimensions or axes; e.g., a tilt sensor of computing device 110 associated with an X (and/or Y and/or Z) axis or dimension can provide tilt angle values for tilts/movements of computing device 110 in the X (and/or Y and/or Z) axis or dimension.

For example, one or more thresholds can be used to associate tilt directions based on tilt angle values. For example, suppose a tilt sensor generates values in the range [min2, max2], where values in the range [min2, T1] are associated with a first tilt direction (e.g., left, right, upward, downward, in, out) and values in the range (T1, max2] are associated with a different second tilt direction (e.g., respectively right, left, downward, upward, out, in). Then, suppose a tilt angle value TAV1 is provided by the tilt sensor. TAV1 can be associated/classified with either the first or the second tilt direction based on threshold T1 using the following rule: if TAV1 is greater than T1, then TAV1 can be associated/classified with the second tilt direction; otherwise, TAV1 can be associated/classified with the first tilt direction.

As another example, suppose a tilt sensor generates values in the range [min3, max3], where values in the range [min3, T1] are associated with a no tilt, values in the range (T1, T2] are associated with a first tilt direction (e.g., left, right, upward, downward, in, out) and values in the range (T2, max2] are associated with a different second tilt direction (e.g., respectively right, left, downward, upward, out, in). A "no tilt" can be an indication that a tilt did not occur in an axis or dimension associated with the tilt angle value; e.g., if the first tilt direction is left, and the second tilt direction is right, then the no tilt can be an indication that a tilt did not occur in the left/right dimension or along an axis associated with left and right tilts.

Then, suppose a tilt angle value TAV1 is provided by the tilt sensor. TAV1 can be associated/classified with either a no tilt, the first tilt direction or the second tilt direction based on thresholds T2 and T1 using the following rule: if TAV1 is greater than T2, then TAV1 can be associated/classified with the second tilt direction; otherwise if TAV1 is greater than T1, TAV1 can be associated/classified with the first tilt direction; and otherwise, TAV1 can be associated with a no tilt. Other example uses of thresholds to determine tilt directions are possible as well.

One or more ranges of tilt angle values can be used to associate tilt directions based on tilt angle values. As an example of left and right tilts, a tilt can have a tilt angle whose value can be in one of at least two non-overlapping ranges of tilt angle values—a first range of values associated with left tilts and a second range of values associated with right tilts. If the tilt angle is in the first range of values, the tilt can classified as having a tilt direction of a left tilt; otherwise, if the tilt angle in the second range of values, the tilt can classified as having a tilt direction of a right tilt. In particular of these embodiments, three non-overlapping ranges of tilt angle values can be used: a first range of values associated with left tilts, a second range of values associated with right tilts, and a third range of values associated with a no tilt For example of three non-overlapping ranges of tilt values, suppose a tilt sensor returns values for a left or right tilt based on a tilt angle whose range of values is [min, max], where tilt angle values in the range [min, 0) are left tilts, tilt angle values equal to 0 are no left/right tilts, and tilt angle values in the range (0, max] are right tilts; then the first range can be [min, 0), the second range can be [0], and the third range can be (0, max].

As another example at least three non-overlapping ranges of tilt angle values, again suppose a tilt sensor a left or right tilt based on a tilt angle whose range of values is [min, max]. Further suppose that at a particular time, the tilt sensor has returned a tilt angle value V2 for a possible movement of computing device 110. Then, computing device 110 can use the following five-part rule to associate or classify tilt angle value V2:

(1) If the tilt angle value V2 is less than or equal to Threshold (T) 224a; that is, V2 is in the range [min, Threshold 224a], then computing device 110 can associate tilt angle value V2 with a left tilt.

(2) Else, if V2 is greater than or equal to Threshold 226a; that is, V2 is in the range [Threshold 226a, max], then the tilt angle value V2 can be associated with a right tilt. Note that if neither (1) nor (2) is met, then V2 is in the range (Threshold 224a, Threshold 226a).

(3) Else, if V2 is in the range (Threshold 224a, Threshold 224b], then computing device 110 can determine whether another tilt angle value V3 received within a time period T1 is greater than V2 to indicate computing device 110 has been moved past Threshold 224b to the left and then moved rightward within time period T1; i.e., V2 and V3 indicate computing device 110 has been quickly tilted leftward and then moved rightward toward an initial position. If V2 and V3 indicate computing device 110 has been moved past Threshold 224b to the left and then moved rightward within time period T1, computing device 110 can associate tilt angle value V2 with a left tilt.

(4) Else, if V2 is in the range [Threshold 226a, Threshold 226b), then computing device 110 can determine whether another tilt angle value V3 received within a time period T1 is less than V2 to indicate computing device 110 has been moved past Threshold 226b to the right and then moved leftward within time period T1; i.e., V2 and V3 indicate computing device 110 has been quickly tilted rightward and then moved leftward toward the initial position. If V2 and V3 indicate computing device 110 has been moved past Threshold 226b to the right and then moved leftward within time period T1, computing device 110 can associate tilt angle value V2 with a right tilt.

(5) Else, computing device 110 can associate tilt angle value V2 with a no tilt. In this case, a no tilt has been associated with V2 since either (a) V2 is in the range (Threshold 224b, Threshold 226b), (b) V2 is in the range (Threshold 224a, Threshold 224b] but V2 and V3 do not indicate computing device 110 has been moved past Threshold 224b to the left and then moved rightward within time period T1, or (c) V2 is in the range [Threshold 226a, Threshold 226b) but V2 and V3 do not indicate computing device 110 has been moved past Threshold 226b to the right and then moved leftward within time period T1.

In other embodiments, other values can be used for tilt angle ranges associated with left tilts, right tilts, and no tilts; e.g., tilt values can be reversed from the example shown above; that is, larger left tilts can be associated with larger tilt angle values increase in size toward a maximum value of a tilt angle value range and larger right tilts can be associated with smaller tilt angle values decrease in size toward a minimum value of a tilt angle value range.

Similar procedures to that used to assign left and right tilt directions can be used to assign tilt directions of upward and downward tilts based on tilt angles associated with upward and downward tilts. As indicated above, these procedures can be based on thresholds and/or ranges of tilt angle values; e.g., thresholds 244a, 244b, 246a, 246b can be used to associate tilt angle values with downward and upward tilts in place of respective thresholds 224a, 224b, 226a, 226b for tilt values in the range [max1, min1]; e.g., values in the range [min1, Threshold 244a] can be associated with downward tilt angles in a similar fashion to Rule (1) above, values in the range [Threshold 246b, max1] can be associated with upward tilt angles in a similar fashion to Rule (2) above, and tilt values in the range (Threshold 244a, Threshold 246a) can be associated with upward tilts, downward tilts, or no tilts using similar rules to Rules(3), (4), and (5) above.

In combination, a tilt having both left/right tilt angles and upward/downward tilt angles can be classified as being in one of either four or nine possible directions. If a tilt is not classified as a no tilt (e.g., two ranges of tilt angles per dimension are used), a tilt can be classified as either: (1) a down-left tilt, if a left/right tilt angle is classified as a left tilt and an upward/downward tilt angle is classified as a downward tilt, (2) a down-right tilt, if a left/right tilt angle is classified as a right tilt and an upward/downward tilt angle is classified as a downward tilt, (3) an upper-left tilt, if a left/right tilt angle is classified as a left tilt and an upward/downward tilt angle is classified as an upward tilt, and (2) an upper-right tilt, if a left/right tilt angle is classified as a right tilt and an upward/downward tilt angle is classified as an upward tilt. If a tilt can be not classified as a no tilt (e.g., more than two ranges of tilt angles per dimension are used), a tilt can be classified as either: (1) a down-left tilt, if a left/right tilt angle is classified as a left tilt and an upward/downward tilt angle is classified as a downward tilt, (2) a downward tilt, if a left/right tilt angle is classified as a no tilt and an upward/downward tilt angle is classified as a downward tilt, (3) a down-right tilt, if a left/right tilt angle is classified as a right tilt and an upward/downward tilt angle is classified as a downward tilt, (4) a left tilt, if a left/right tilt angle is classified as a left tilt and an upward/downward tilt angle is classified as a no tilt, (5) a no tilt, if each of a left/right tilt angle and an upward/downward tilt angle is classified as a no tilt, (6) a left tilt, if a left/right tilt angle is classified as a right tilt and an upward/downward tilt angle is classified as a no tilt, (7) an upper-left tilt, if a left/right tilt angle is classified as a left tilt and an upward/downward tilt angle is classified as an upward tilt, (8) an upward tilt, if a left/right tilt angle is classified as a no tilt and an upward/downward tilt angle is classified as an upward tilt, and (9) an upper-right tilt, if a left/right tilt angle is classified as a right tilt and an upward/downward tilt angle is classified as an upward tilt.

In other examples, tilts can be normalized so that only left, right, upward, downward, upper-left (that is, a tilt upward and leftward), upper-right, down-left (that is, a tilt downward and leftward), and down-right tilts are utilized by computing device 110. Other normalized tilts are possible as well.

In embodiments where depth axis/in and out tilts are utilized, a similar procedure using two or more ranges of tilt angles that was described to assign left and right tilt directions can be used to assign tilt directions of in and out tilts based on tilt angles associated with in and out tilts. The in and out tilts can be used in combination with left and right tilts and upward and downward tilts to classify a tilt angle as having one of between eight (if tilts cannot be classified as no tilts in any of three dimensions) and twenty-seven (if tilts can be classified as no tilts in any of three dimensions) possible directions in a similar fashion to assigning combinations left and right tilts and upward and downward tilts to one of four to nine possible directions as discussed above. Other uses of ranges and thresholds of tilt angle values to associate/classify tilt angles with tilt directions are possible as well.

Tilts can be specified with respect to a set of axes associated with computing device 110. At upper left of FIG. 2A, three-dimensional axes are shown for computing device 110 that include horizontal axis or X axis 202, vertical axis or Y axis 204, and depth axis or Z axis 206. Horizontal axis 202 is shown as going across front plane 208a of computing device 110, vertical axis 204 is shown as going up-and-down front plane 208a of computing device 110, and depth axis 206 is shown as going through front plane 208a and back plane 208b of computing device 110. In some examples, horizontal axis 202 and vertical axis 204 can be considered to include/lay in front plane 208a. In other examples, front plane 208a of computing device 110 can be a plane that includes a front surface of computing device 110 and back plane 208b of computing device 110 can be a plane that includes a back surface of computing device 110. In particular, the front surface of computing device 110 can include part of a touch screen, display, and/or other input/output device(s) of computing device 110.

An upper-right portion of FIG. 2A shows example left and right tilts of computing device 110 in a plane made up by depth axis 206 and horizontal axis 202; that is, rotations about vertical axis 204. For example, if computing device 110 moves from an initial position (IP) to a position (P) 210a or 210b, then computing device 110 can be considered to have made a left tilt. As another example, if computing device 110 moves from the initial position to position 210c or 210d, then computing device 110 can be considered to have made a right tilt.

Figure 2B:
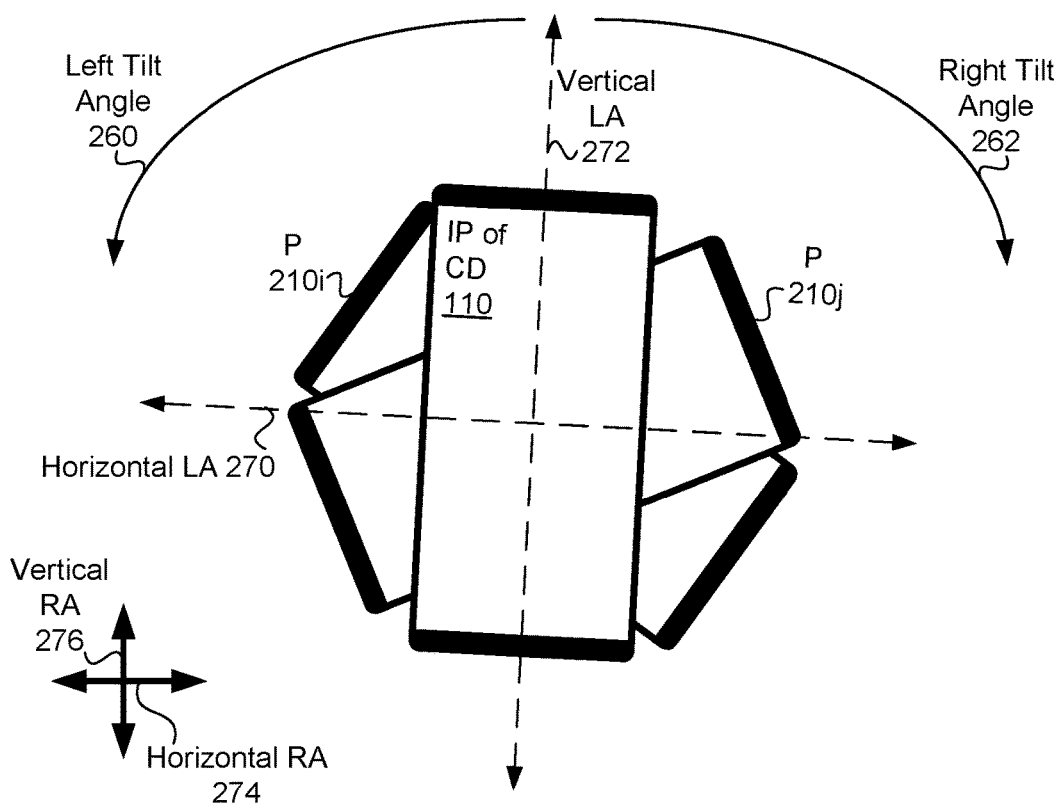

A lower portion of FIG. 2B shows example downward and upward tilts of computing device 110 in a plane made up by depth axis 206 and vertical axis 204; that is, rotations about horizontal axis 202. For example, if computing device 110 moves from the initial position to a position 210e or 210f, then computing device 110 can be considered to have made a downward tilt. As another example, if computing device 110 moves from the initial position to position 210g or 210h, then computing device 110 can be considered to have made an upward tilt.

A tilt can have a tilt angle. A tilt angle of a tilt can be determined with respect to one or more axes. For example, an upper portion of FIG. 2A shows computing device 110 at an initial position that is angled slightly to the left. Then, tilts of computing device 110 can be determined with respect to local axes (LAs) 230 and 232, reference axes 234 and 236, or other axes. Local axes 230 and 232 can be determined based on an initial position of computing device 110 at the time of the tilt; e.g., if computing device is initially tilted 5° to the left, local axis 232 can be initially at 5° to the left; then, a tilt ending at 15° to the right can be considered as a right tilt having a tilt angle of 20° with respect to local axes 230 and 232. As another example, if computing device is initially tilted 5° to the right, local axis 232 can be initially at 5° to the right; then, a tilt ending at 15° to the right can be considered as a right tilt having a tilt angle of 10° with respect to local axes 230 and 232.

Reference axes 234 and 236 can be determined based a reference vector or vectors; e.g., a gravity vector pointing toward the center of the earth. In this example, a tilt that ends with computing device being at a 15° angle to the right from depth reference axis 234 can be considered as a 15° right tilt.

If reference axes are used, a tilt angle can be determined by taking the difference between the ending position and the initial position of the computing device; e.g., a tilt ending at 15° to the right where computing device 110 is initially tilted 5° to the right can be considered to be a right tilt of (15−5)°=10°.

In the lower portion of FIG. 2A, local axes 250 and 252 are generally aligned with respective reference axes 254 and 256. As such, tilt angles determined using local axes 250 and 252 can be the same (or very close to) as tilt angles determined using reference angles 254 and 256.

A tilt can have a tilt direction; e.g., a left tilt, a right tilt, an upward tilt, a downward tilt, an inward tilt, and/or an outward tilt. For example, the upper portion of FIG. 2A shows possible tilts of computing device 110 as classified as left tilts with respect to left tilt angle 220. If a tilt of computing device 110 has a left tilt angle value between 0° and 180° (or between 0 and π radians) as determined with respect to left tilt angle 220, then the tilt can be classified as a left tilt. Similarly, if a tilt of computing device 110 has a right tilt angle value between 0° and 180° (or between 0 and π radians) as determined with respect to left tilt angle 222, then the tilt can be classified as a right tilt.

Also, the lower portion of FIG. 2A shows possible tilts of computing device 110 as classified as downward tilts with respect to downward tilt angle 240. If a tilt of computing device 110 has a downward tilt angle value between 0° and 180° (or between 0 and π radians) as determined with respect to downward tilt angle 240, then the tilt can be classified as a downward tilt. Similarly, if a tilt of computing device 110 has an upward tilt angle value between 0° and 180° (or between 0 and π radians) as determined with respect to upward tilt angle 242, then the tilt can be classified as an upward tilt. In some examples, a tilt can specified using both a tilt angle and a tilt direction; e.g., a left tilt of 10°, a downward tilt of 30°.

In some embodiments, a tilt angle value of 0° or range of tilt angle values including 0° can be associated with a no tilt. For example, suppose tilts of computing device in a upward/downward dimension have a range R1 of tilt angle values of (−180°, 180°), where negative values in this range of tilt angle values are associated with downward tilts, positive values in this range of tilt angle values are associated with upward tilts, and the 0° value is associated with a no tilt in the upward/downward dimension. Then, if a tilt of computing device 110 has a tilt angle value: (i) between −5° and −180° as determined with respect to range R1, then the tilt can be classified as a downward tilt; (ii) between 5° and 180° as determined with respect to range R1, then the tilt can be classified as an upward tilt; or (iii) between −5° and 5°, as determined with respect to range R1, then the tilt can be classified as a no tilt in the upward/downward dimension. In other examples, a no tilt range can be different than between −5° and 5°. In still other examples, a value other than 0° and/or range including 0° can be associated with a no tilt.

The tilt direction can be used during hop navigation to determine which way to navigate in an extended screen space; e.g., a left tilt received during hop navigation can lead to a leftward movement within the extended screen space. In some examples, the tilt angle can be used to determine a speed of movement within the extended screen space during hop navigation. More specifically, the speed of movement within the extended screen space during hop navigation can be proportional to, or otherwise based on, the tilt angle; e.g., the larger (or smaller) the tilt angle, the faster (or slower) the speed of movement within the extended screen space during hop navigation. As such, the pair (tilt direction, tilt angle) can be used to specify a vector of movement within the extended screen space during hop navigation, where the direction of the vector is determined as, or is otherwise based on, the tilt direction and the magnitude of the vector is proportional to, or otherwise based on, the tilt angle.

FIG. 2B shows another set of left and right tilts that can be used in other embodiments to those shown in FIG. 2A. In particular, FIG. 2B shows example left and right tilts of computing device 110 in a plane made up by horizontal axis 202 and vertical axis 204; that is, rotations about depth 206. For example, if computing device 110 moves from an initial position to position 210i, then computing device 110 can be considered to have made a left tilt. As another example, if computing device 110 moves from the initial position to position 210j, then computing device 110 can be considered to have made a right tilt. In other embodiments, rotations about each of the three axes 202, 204, and 206 can be used as tilts while performing hop navigation in a 3D (or higher dimensional) space. Other representations of tilts and vectors of movement through extended screen spaces are possible as well.

Figure 3A:
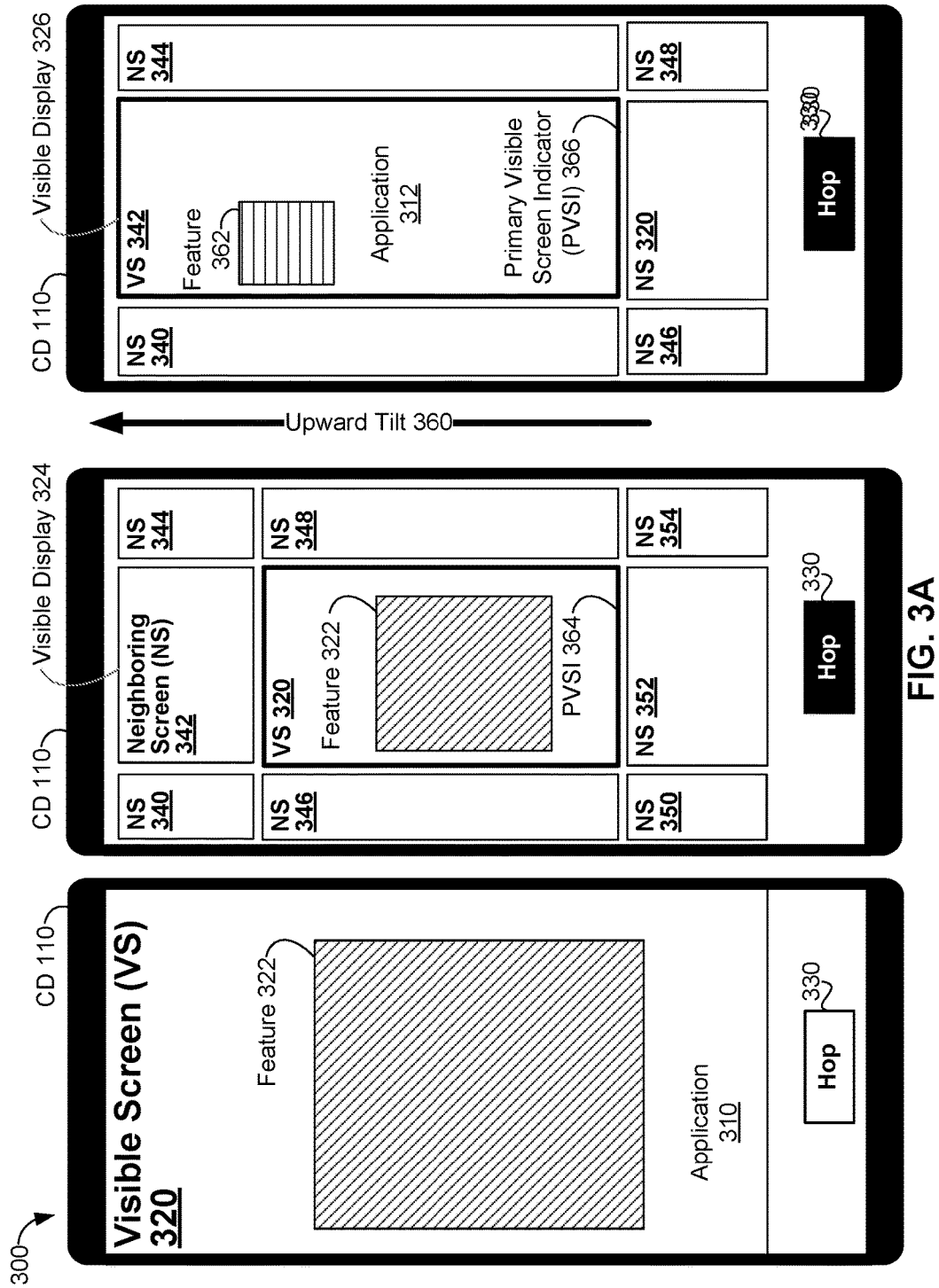
FIGS. 3A and 3B show an example scenario involving hop navigation, in accordance with an example embodiment.
Figure 3B:
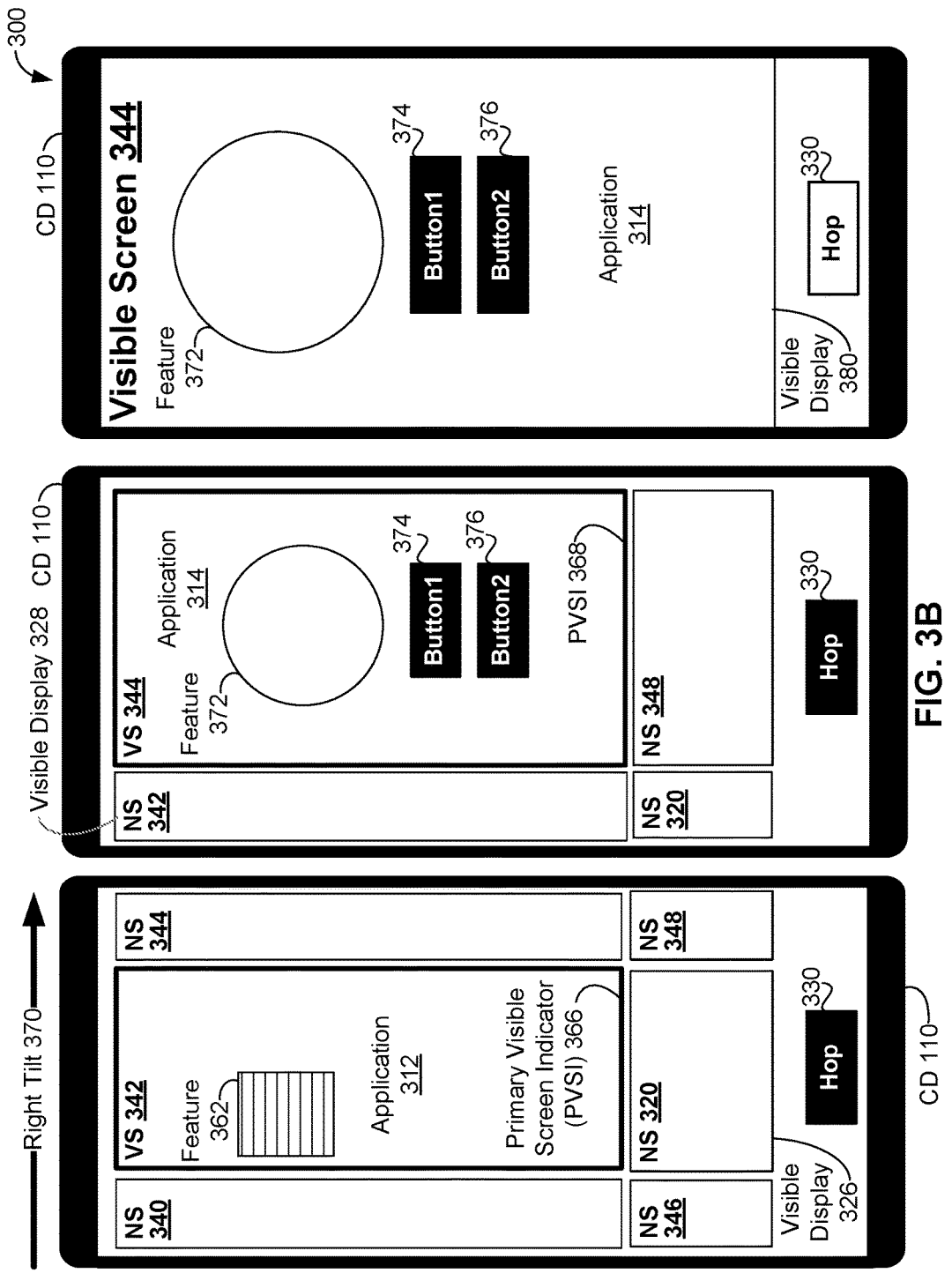

FIGS. 3A and 3B show scenario 300 involving hop navigation, in accordance with an example embodiment. In scenario 300, computing device 110 is initially used to view visible screen (VS) 320 generated by software application 310. Hop navigation is then activated for computing device 110. While hop navigation is activated, computing device 110 receives a down tilt and then a left tilt, which lead to computing device 110 to navigate to visible screen 344. Hop navigation is then deactivated, and computing device 110 then displays visible screen 344 to complete scenario 300.

As shown at left of FIG. 3A, scenario 300 begins with computing device 300 displaying visible screen 320 generated by application 310, where visible screen 320 includes feature 322. At the onset of scenario 300, hop navigation is deactivated as visibly indicated by a white background of hop navigation button 330.

As shown at a center portion of FIG. 3A, scenario 300 continues with hop navigation being activated for computing device 110. After hop navigation is activated, computing device 110 generates visible display 324 where a background of hop navigation button 330 has been changed to black to visually indicate that hop navigation has been activated. Another visual indicator that hop navigation has been activated is that a center portion of visible display 324 shows a reduced-size version of visible screen 320 (in comparison with the size of visible screen 320 shown prior to hop navigation); e.g., a displayed area of reduced-size visible screen 320 can be 50%, 66.6%, 70%, 75%, or some other fraction of a displayed area of visible screen 320 prior to hop navigation. Visible display 324 also shows portions of eight neighboring screens 340, 342, 344, 346, 348, 350, 352, 354, each of which neighbor visible screen 320 in an expanded display plane (not shown in FIGS. 3A and 3B).

To indicate that visible screen 320 is a primary screen, visible screen 320 is shown as being relatively larger than each of neighboring screens. 340, 342, 344, 346, 348, 350, 352, 354. Visible screen 320 is also shown surrounded by primary visible screen indicator (PVSI) 364, shown in FIG. 3A as a black border of visible screen 320. Primary visible screen indicator 364 can clearly illustrates that visible screen 320 is the primary screen.

Scenario 300 continues, as shown at a right portion of FIG. 3A, with computing device 110 being tilted by upward tilt 360. In response to upward tilt 360, computing device 110 navigates to the neighboring screen upward from the primary screen; e.g., navigates from visible screen 320 to neighboring screen 342. Also in response to upward tilt 360, computing device 110 generates a brief vibration or "bump" to haptically indicate that a hop has been made from visible screen 320 to neighboring screen 342. In other scenarios, haptic feedback is not provided by computing device 110 during hop navigation.

In scenario 300, screen 342 illustrating feature 362 is generated by software application 312. As such, upward tilt 360 causes computing device 110 to generate and display visible display 326, which shows that visible screen 342 has become the primary screen and that screen 320 has become a neighboring screen. Visible display 326 shows that screen 342 is the primary screen by: having visible screen 342 occupy the center of visible display 326, showing visible screen 342 as being relatively larger than neighboring screens 320, 340, 344, 346, 348 shown in visible display 326, and surrounding visible screen 342 with primary visible screen indicator 366.

Turning to a left portion of FIG. 3B, scenario 300 continues with computing device 110 being tilted by right tilt 370 while displaying visible display 326. In response to right tilt 370, computing device 110 navigates to the neighboring screen rightward from the primary screen; e.g., navigates from visible screen 342 to neighboring screen 344. Also in response to right tilt 370, computing device 110 generates a brief vibration or "bump" to haptically indicate that a hop has been made from visible screen 342 to neighboring screen 344.

A center portion of FIG. 3B shows that scenario 300 proceeds with computing device 110 generating visible display 328 in response to right tilt 370. Visible display 328 includes display of visible screen 344 as a primary screen and neighboring screens 320, 342, and 348 As such, visible display 328 shows that screen 344 has become the primary screen and that screen 342 has become a neighboring screen. Visible display 328 shows that visible screen 344 is the primary screen by: having visible screen 344 occupy the center of visible display 328, showing visible screen 344 as being relatively larger than neighboring screens 320, 342, 348 shown in visible display 328, and surrounding visible screen 344 with primary visible screen indicator 368. In scenario 300, screen 344 is generated by software application 314 to illustrate feature 372 and provide buttons 374 and 376.

At right of FIG. 3B, scenario 300 proceeds with hop navigation being deactivated by computing device 110. After hop navigation is deactivated, computing device 110 changes a background of hop navigation button 330 to white to indicate that hop navigation has been deactivated and generates visible display 380 to show visible screen 344. Other indicators that hop navigation has been deactivated include: visible display 380 only showing one screen; i.e., no neighboring screens to visible screen 344 are shown in visible display 380; visible display 380 shows a larger version of visible screen 344 in comparison with the size of primary screen 344 displayed during navigation, and that no primary visible screen indicator is displayed. Upon completion of the display of visible screen 344, scenario 300 can be completed.

Figure 4A:
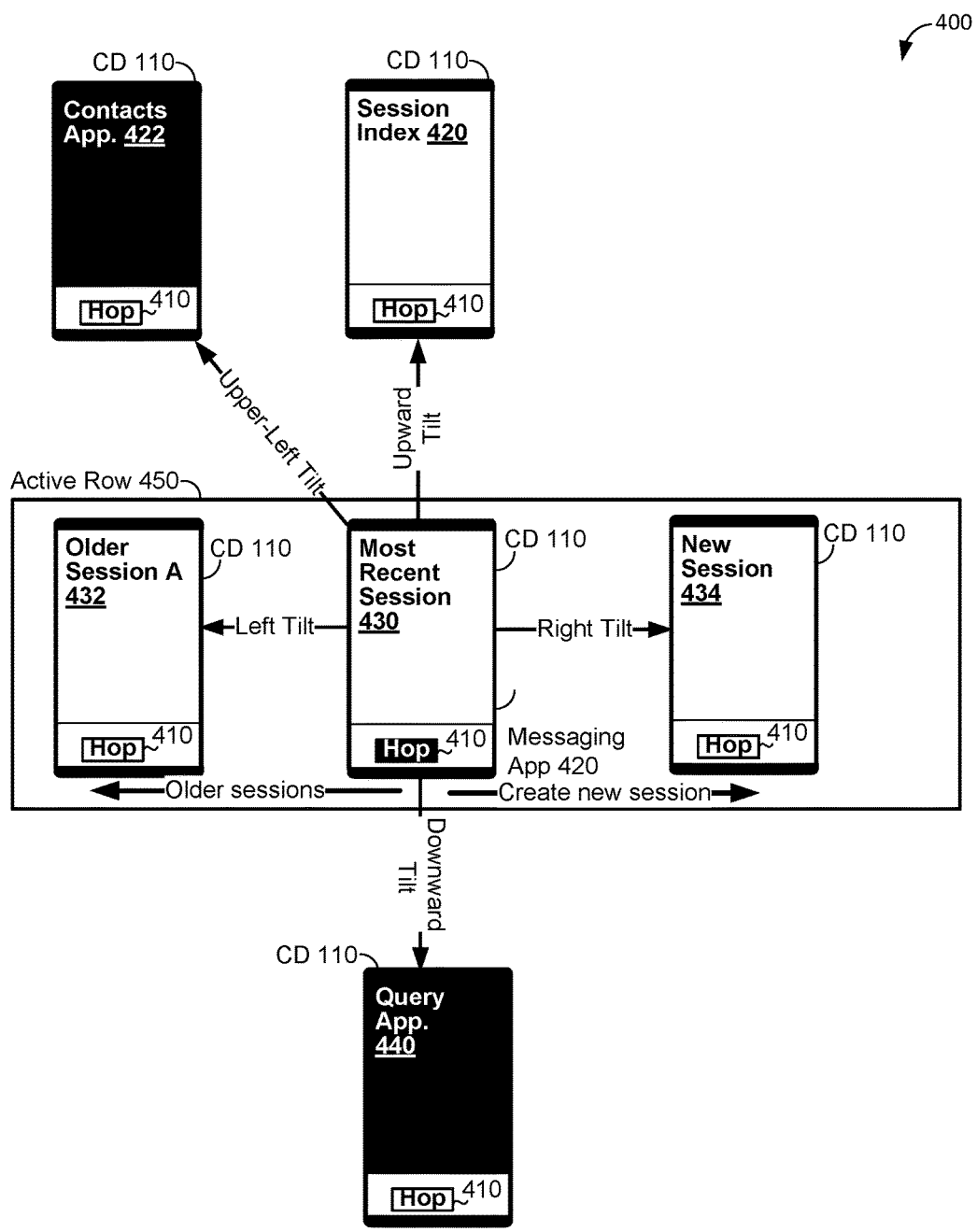
FIGS. 4A and 4B show another scenario involving hop navigation, in accordance with an example embodiment.
Figure 4B:
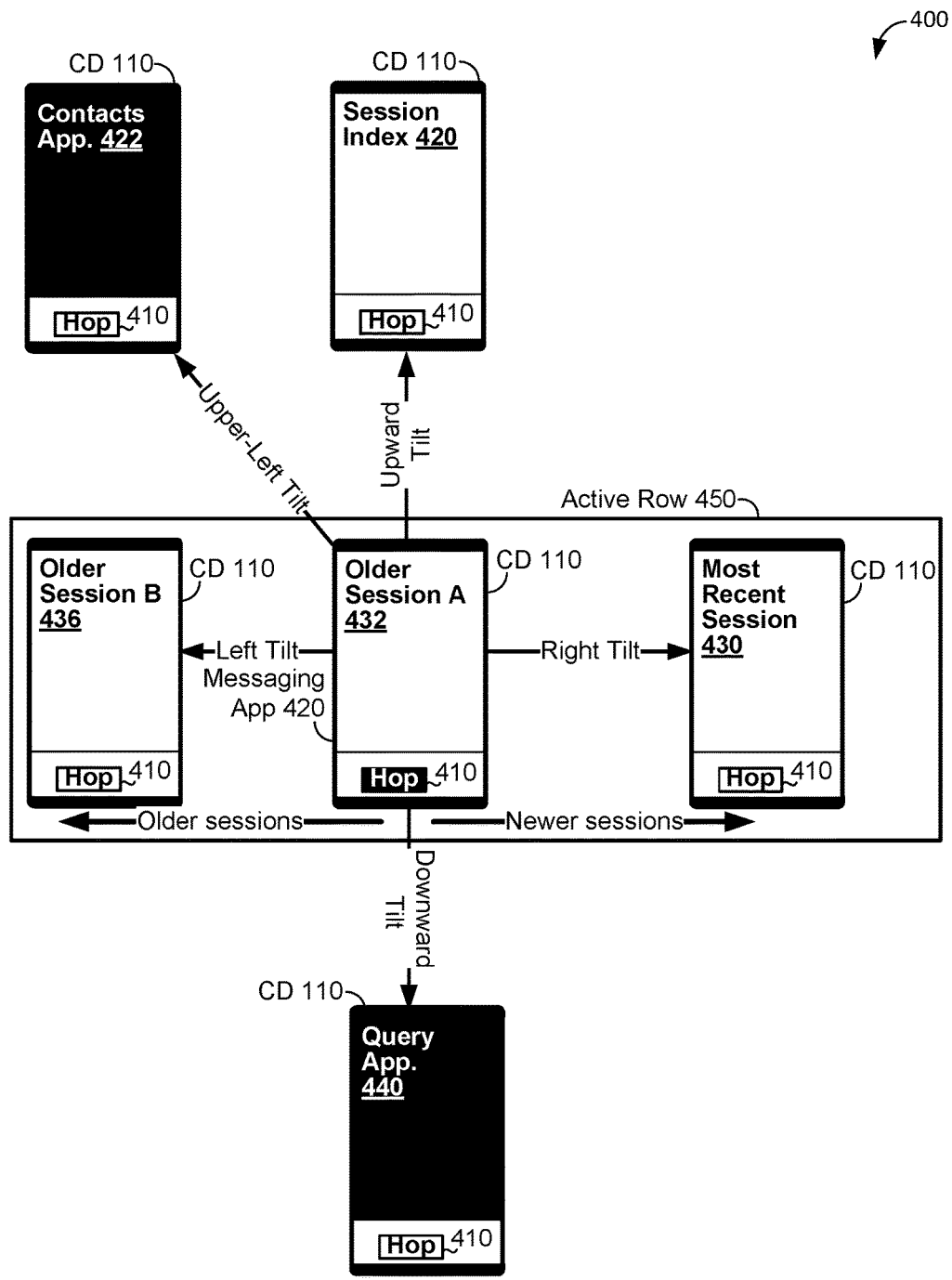

FIGS. 4A and 4B show scenario 400 involving hop navigation, in accordance with an example embodiment. In scenario 400, computing device 110 executes software of messaging application 420. While executing messaging application 420, computing device 110 is enabled to use hop navigation to navigate along an active row of messaging sessions and access various applications related to messaging application 420. In particular, hop navigation is used to navigate from a current messaging session to a prior messaging session during scenario 400.

FIG. 4A shows messaging application 420 being executed to conduct several communication sessions; e.g., text messaging conversations, video and/or telephone calls, electronic mail exchanges. In scenario 400, computing device 110 stores information about one or more communication sessions carried out by executing messaging application 420.

Information about active communication sessions; e.g., communication sessions still in progress, and/or past communication sessions; e.g., communication sessions that have completed, can be accessed using hop navigation techniques. That is, computing device 110 can use hop navigation to navigate between communication sessions, such as those represented by active row 450 which includes most recent session 430 and older session "A" 432. In some examples, most recent session 430 can be an active session; while in other examples, most recent session 430 can be a past session. In even other examples, older session "A" 432 can be an active session (e.g., messaging application 420 supports multiple active sessions and older session "A" 432 is an active but older session than most recent session 430); while in other examples, older session "A" 432 can be a past session.

FIG. 4A shows that hop navigation button 410 can be used to activate hop navigation as discussed above in more detail in the context of scenarios 100 and 300. More specifically, hop navigation can enable hopping from left to right (or right to left) along active row 450, which corresponds to moving forward (or backward) in time from the oldest communication session that involves computing device 110 to most-recently stored and/or active communication sessions that involve use of messaging application 420 executing on computing device 110. In keeping with this time-oriented model, tilting right from the most-recently stored and/or active communication session; e.g., most recent session 430, can be used to initiate a new (i.e., future) communication session; e.g., new session 434 shown to the right of most recent session 430 on active row 450. FIG. 4B shows that new session 434 can be initiated during hop navigation in response to a right tilt received while displaying most recent session 430.

While hop navigation has been activated in scenario 400, a left tilt can cause messaging application 420 to display information about an older session than a currently displayed session. For example, if messaging application 420 is displaying most recent session 430 as a primary screen, a left tilt will cause messaging application 420 to display older session "A" 432 as a primary screen.

Also, when hop navigation has been activated, an upward tilt can be used to request messaging application 420 to provide session index information; e.g., a listing of active and/or past messaging sessions, messaging session durations, parties taking part in the messaging sessions, applications related to the messaging sessions, and/or other information related to messaging sessions conducted using messaging application 420.

In some examples, screens along active row 450 can be arranged based on fixed criteria, such as a time that a communication session corresponding to a screen was initiated; e.g., a first screen displaying a communication session that started at 12:00 today is newer than a second screen displaying a communication session that started at 11:00 today. Using the time a communication session is initiated to arrange screens along active row 450 implies that the arrangement of screens along active row 450 does not change as long as no screens are deleted, since a time that a communication session is initiated does not change. Other fixed criteria are possible as well, such as an arrangement of screens based on a position of a screen within active row 450 as determined at a time when hop navigation is activated.

In some of these examples, deletion of screens can change arrangements of screens along active row 450 that use fixed criteria. For example, suppose the completion/termination of a communication session leads to deletion of a corresponding screen on active row 450. Once a screen has been deleted, the arrangement of the remaining screens along active row 450 can change; e.g., to fill a gap made by the now-deleted screen, even though fixed criteria are used in arranging the screens. In other examples, deletion of screens along active row 450 does not change arrangements of screens that use fixed criteria. For example, suppose the completion/termination of a communication session leads to replacement of a corresponding screen on active row 450 by a placeholder screen; e.g., a screen that indicates "Session Terminated". Once a screen has been deleted, the ordering of the remaining screens along active row 450 can stay fixed as there the gap in active row 450 made by the now-deleted screen is filled by the placeholder screen. In particular of these examples, placeholder screens can be removed from active row 450 once hop navigation is deactivated. Then, when hop navigation is (re)activated, the fixed criteria can be used to arrange screens in active row 450 while omitting a screen corresponding to the now-completed/termination of a communication session In other examples, screens along active row 450 can be arranged based on recency; that is, based on a time that the communication session was most recently accessed. As such, accessing screens via hop navigation can change the arrangement of screens on active row 450. For example, if computing device 110 arranges screens along active row 450 based on recency, then a determination of an ordering based on most recently accessed screens changes based as screens are accessed via hop navigation.

In still other examples, screens along active row 450 can be arranged as based on a most recent communication; that is, based on a most recent time that a communication session was used to send or receive a communication. As such, the order of screens on active row 450 can change based on most recent communication criteria. The recent communication criteria may be independent of hop navigation. That is, accessing a screen via hop navigation on active row 450 may change its position within active row 450 (e.g., when the accessed screen is used to send a communication) or may not change its position within active row 450 (e.g., when the accessed screen is not used to send a communication and a communication is not received while the screen is being accessed).

Other criteria for arranging screens along active row 450 are possible as well; e.g., by name, by color, by user-defined priorities and/or other priorities. Some screens accessible via hop navigation can be always in the same place (absolute or relative to the selected screen), while other screens change position; or all screens could be reorganized every single hop interaction.

While hop navigation is activated for messaging application 420, other tilts can be used to invoke applications related to, but different from messaging application 420. FIG. 4A shows that an upper-left tilt; that is, a tilt upward and leftward, can be used to invoke a contact application that can be used to review, update, insert, and/or delete information about one or more contacts that may be parties to messaging sessions. FIG. 4A also shows that a downward tilt can be used to invoke a query application; e.g., a web browser application or other search tool application. In FIGS. 4A and 4B, screens generated by applications other than messaging application 420 are shown in black, while screens generated by messaging application 420 are shown in white.

In some examples, hop navigation can be restricted for an application that itself was invoked via hop navigation; e.g., if query application 440 is invoked from messaging application 420 via hop navigation, then hop navigation for query application 440 can be restricted. An example of such restricted hop navigation would be to restrict query application 440 to only use hop navigation to return to messaging application 420, perhaps using an upward tilt that mirrors the downward tilt performed to invoke query application 440. Other restrictions on invoked applications are possible as well.

In scenario 400, hop activation is activated while messaging application 420 is executing, computing device 110 is tilted left, and hop activation is deactivated after messaging application 420 generates a display of older session "A" 432. In other scenarios, messaging application 420 can support hop navigation without explicit activation and deactivation; e.g., a left tilt received while executing messaging application 420 will cause messaging application to display information about an older session whether or not hop navigation has been explicitly activated. In some of these other scenarios, settings data can be used to control the use of specific aspects of hop navigation without explicit activation; e.g., a user can use settings data to affirmatively indicate that hop navigation should be used without explicit activation/deactivation while executing some or all software applications.

Turning to FIG. 4B, scenario 400 continues with messaging application 420 providing the display of older session "A" 432 after hop navigation has been deactivated. While older session "A" 432 is displayed, hop navigation can enable messaging application 420 to navigate to older sessions of active row 450 via left tilts and to newer sessions of active row 450 via right tilts. More specifically as shown in FIG. 4B, while hop navigation is activated and older session "A" 432 is displayed, a left tilt can cause older session "B" 436 to be a primary screen and a right tilt can cause most recent session 430 to be a primary screen. Further, while older session "A" 432 is displayed and hop navigation is activated, an upward tilt causes messaging application 410 to display session index 420, an upper-left tilt invokes contacts application 422, and a downward tilt invokes query application 440.

Scenario 400 illustrates that hop navigation can be used a part of a framework of gestures. That is, hop navigation works the same way during all messaging sessions handled by messaging application 420, except for not allowing rightward tilts when a most recent session is displayed (or, in other scenarios, not allowing leftward tilts when an oldest session is displayed). For example, regardless of which session is being handled, the same upward tilt causes the session index to be displayed, the same upper-left tilt invokes a contact application, and the same downward tilt invokes a query application. This framework enables modeling use of a collection of related applications that are connected by consistent gestures, and therefore eases use of these applications as well as computing device 110.

Figure 4C:
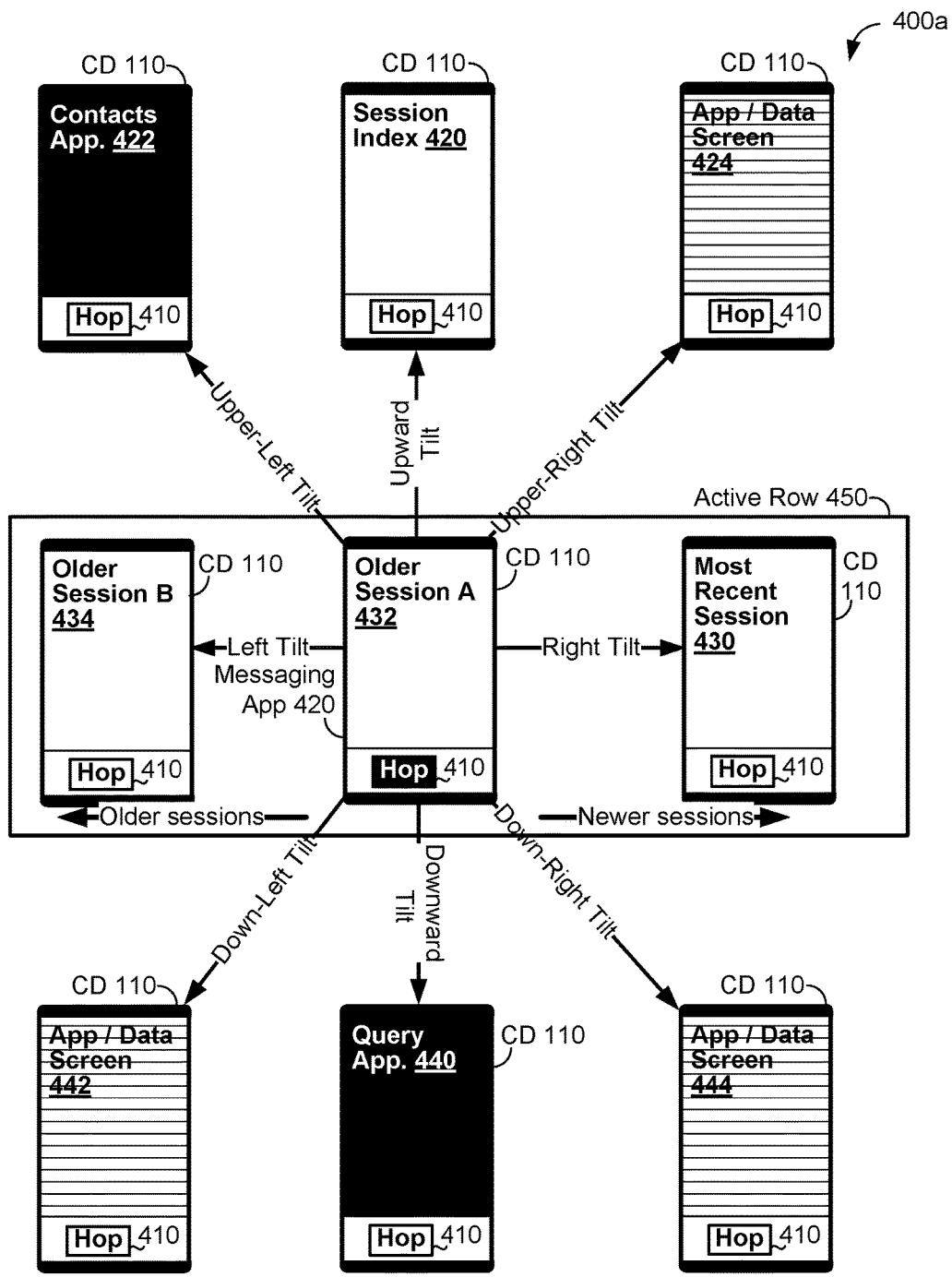
FIG. 4C shows yet another scenario involving hop navigation, in accordance with an example embodiment.

FIG. 4C shows scenario 400*a* involving hop navigation, in accordance with an example embodiment. Scenario 400*a* is related to scenario 400 in computing device 110 is executing that hop navigation is enabled to provide a framework of gestures for using messaging application 420 and some related applications. However, hop navigation operates somewhat differently in scenario 400a than in scenario 400. In scenario 400a, the hop navigation framework provides more options for accessing information and applications than provided in scenario 400a.

FIG. 4C shows computing device 110 executing messaging application 420 in scenario 400a. When hop navigation is activated while messaging application 420 is handling older session "A" 432, left and right tilts can be used to navigate along active row 450 to reach respective older and newer sessions; e.g., respective older session "B" 436 and most recent session 430. When hop navigation is activated during execution of messaging application 420, upward and downward tilts allow access to data and applications related to a current messaging session; e.g., older session "A" 432. As with scenario 400, an upward tilt during scenario 400a enables access to session index 420, an upper-left tilt invokes contacts application 422, a downward tilt allows access to query application 440, and a downward tilt invokes query application 440.

However, additional tilts in scenario 400a can be used to access additional applications and/or data via the hop navigation framework used by messaging application 420 than were accessible during scenario 400. FIG. 4C shows that an upper-right tilt during hop navigation can be used to access application and/or data screen 424, a down-left tilt during hop navigation can be used to access application and/or data screen 442, and a down-right during hop navigation can be used to access application and/or data screen 444. These additional three screens 424, 442, and 444 can be provided by messaging application 420 and/or by other applications than messaging application 420. In FIG. 4C, screens generated by messaging application 420 are shown in white, screens generated by applications other than messaging application 420 are shown in black, and screens that can be generated by either messaging application 420 or an application other than messaging application 420 are shown with horizontal lines.

Applications and/or data selections for the three screens 424, 442, and 444, and perhaps other screens accessible using a hop navigation framework can be made using hop-navigation settings data. The hop-navigation settings data can specify an application or data screen associated with a tilt; e.g., specify that query application 440 is associated with a downward tilt. For example, hop-navigation settings data can specify data and/or applications accessible via each of the eight tilts shown in FIG. 4C; e.g., upper-left, upward, upper-right, left, right, down-left, downward, and down-right. This hop-navigation settings data can be specific to one application such as messaging application 420 and/or can be used by multiple applications. For example, general hop-navigation settings data can be specified for all applications executing on computing device 110, but that general hop-navigation settings data can be overridden by hop-navigation settings data and/or other selections made by a specific application; e.g., the use of left and right tilts as specified by general hop-navigation settings data can be overridden messaging application 420 to provide hop navigation along active row 450.

When used by multiple applications, the hop navigation framework can provide a consistent gesture-based interface to computing device 110, perhaps upon reliance of hop-navigation settings data. An operating system of computing device 110 can provide functionality to support the hop navigation framework and to invoke additional applications as illustrated in scenarios 400 and 400a. If the operating system provides support for hop navigation to access additional applications, then any application can use hop navigation to access the additional applications. Thus, a user of computing device 110 can make the tilts shown in FIGS. 4A, 4B, and 4C to access additional applications. In some examples, these additional applications can be statically selected by the user; e.g., using profile and/or settings data to specify additional applications reached using via hop navigation, by the application and/or by the operating system. In other examples, the additional applications can be dynamically selected by an application and/or by the operating system; e.g., a web browser application can dynamically select applications based on visited web sites and/or search terms entered into the web browser; a messaging application can dynamically select applications based on messaging content and/or participants, an operating system and/or an application can select from available and/or executing applications to provide additional applications accessible via hop navigation. Combinations of static and dynamic selection of additional applications are possible as well; e.g., settings data for additional applications can be changed, dynamic selections of additional applications can be overridden or otherwise constrained by static settings data. Other techniques for selecting applications for use in hop navigation are possible as well.

Example Data Network

Figure 5:
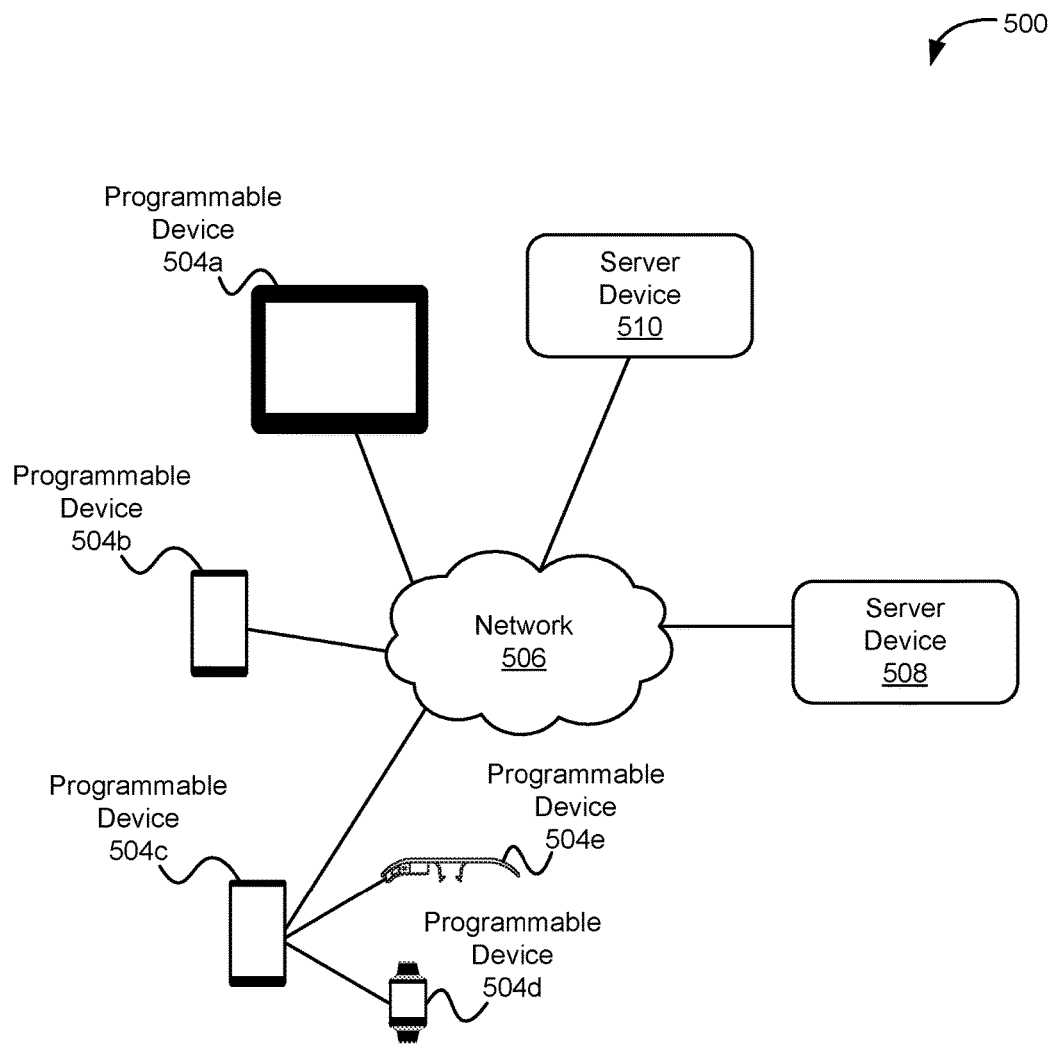
FIG. 5 depicts a distributed computing architecture, in accordance with an example embodiment.

FIG. 5 depicts a distributed computing architecture 500 with server devices 508, 510 configured to communicate, via network 506, with programmable devices 504a, 504b, 504c, 504d, 504e, in accordance with an example embodiment. Network 506 may correspond to a LAN, a wide area network (WAN), a corporate intranet, the public Internet, or any other type of network configured to provide a communications path between networked computing devices. Network 506 may also correspond to a combination of one or more LANs, WANs, corporate intranets, and/or the public Internet.

Although FIG. 5 only shows five programmable devices, distributed application architectures may serve tens, hundreds, or thousands of programmable devices. Moreover, programmable devices 504a, 504b, 504c, 504d, 504e (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some embodiments, such as indicated with programmable devices 504a, 504b, 504c, programmable devices can be directly connected to network 506. In other embodiments, such as indicated with programmable devices 504d and 504e, programmable devices can be indirectly connected to network 506 via an associated computing device, such as programmable device 504c. In this example, programmable device 504c can act as an associated computing device to pass electronic communications between programmable devices 504d and 504e and network 506. In still other embodiments not shown in FIG. 5, a programmable device can be both directly and indirectly connected to network 506.

Server devices 508, 510 can be configured to perform one or more services, as requested by programmable devices 504a-504e. For example, server device 508 and/or 510 can provide content to programmable devices 504a-504e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 508 and/or 510 can provide programmable devices 504a-504e with access to software for database, search, computation, graphical, audio, video, World Wide Web/Internet utilization, and/or other functions. Many other examples of server devices are possible as well.

Computing Device Architecture

Figure 6:
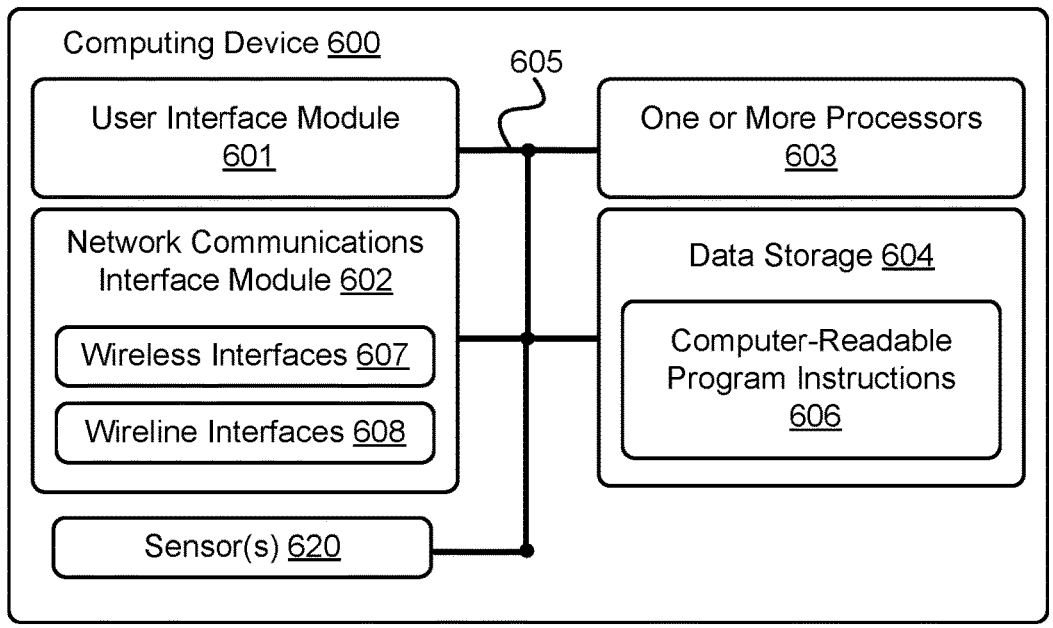
FIG. 6 is a functional block diagram of an example computing device, in accordance with an example embodiment.

FIG. 6 is a functional block diagram of computing device 600, in accordance with an example embodiment. In particular, computing device 600 shown in FIG. 6 can be configured to perform at least one function of computing device 110, hop navigation buttons 112, 330, 410, visible displays 122, 124, screens 126, 128, visible screens 320, 342, 344, applications 310, 312, 314, 420, 424, 440, 442, query page 422, sessions 430, 432, 434, 436, a tilt sensor, programmable devices 504a, 504b, 504c, 504d, 504e, network 506, server devices 508, 510, and/or at least one function related to scenarios 100, 300, 400, 400a and/or method 700.

Computing device 600 may include a user interface module 601, a network-communication interface module 602, one or more processors 603, data storage 604, and one or more sensors 620, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a track ball, a joystick, a camera, a voice recognition module, and/or other similar devices. User interface module 601 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 601 can also be configured to generate audible output(s), such as a speaker, speaker jack, audio output port, audio output device, earphones, and/or other similar devices. User interface module 601 can further be configured with one or more haptic devices that can generate haptic output(s), such as vibrations and/or other outputs detectable by touch and/or physical contact with computing device 600. In some embodiments, user interface module 601 can be used to provide a graphical user interface (GUI) for utilizing computing device 600.

Network-communications interface module 602 can include one or more wireless interfaces 607 and/or one or more wireline interfaces 608 that are configurable to communicate via a network. Wireless interfaces 607 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 603 can include one or more general purpose processors, and/or one or more special purpose processors (e.g., digital signal processors, graphics processing units, application specific integrated circuits, etc.). One or more processors 603 can be configured to execute computer-readable program instructions 606 that are contained in data storage 604 and/or other instructions as described herein.

Data storage 604 can include one or more computer-readable storage media that can be read and/or accessed by at least one of one or more processors 603. The one or more computer-readable storage media can include volatile and/or non-volatile storage components, such as optical, magnetic, organic or other memory or disc storage, which can be integrated in whole or in part with at least one of one or more processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data. In some embodiments, data storage 604 can additionally include storage required to perform at least part of the herein-described methods, scenarios, and techniques and/or at least part of the functionality of the herein-described devices and networks.

In some embodiments, computing device 600 can include one or more sensors 620. Sensor(s) 620 can be configured to measure conditions in an environment of computing device 600 and provide data about that environment. For example, sensor(s) 620 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) sensors to measure locations and/or movements of computing device 600, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 600, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 600, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 620 are possible as well.

Example Methods of Operation

Figure 7:
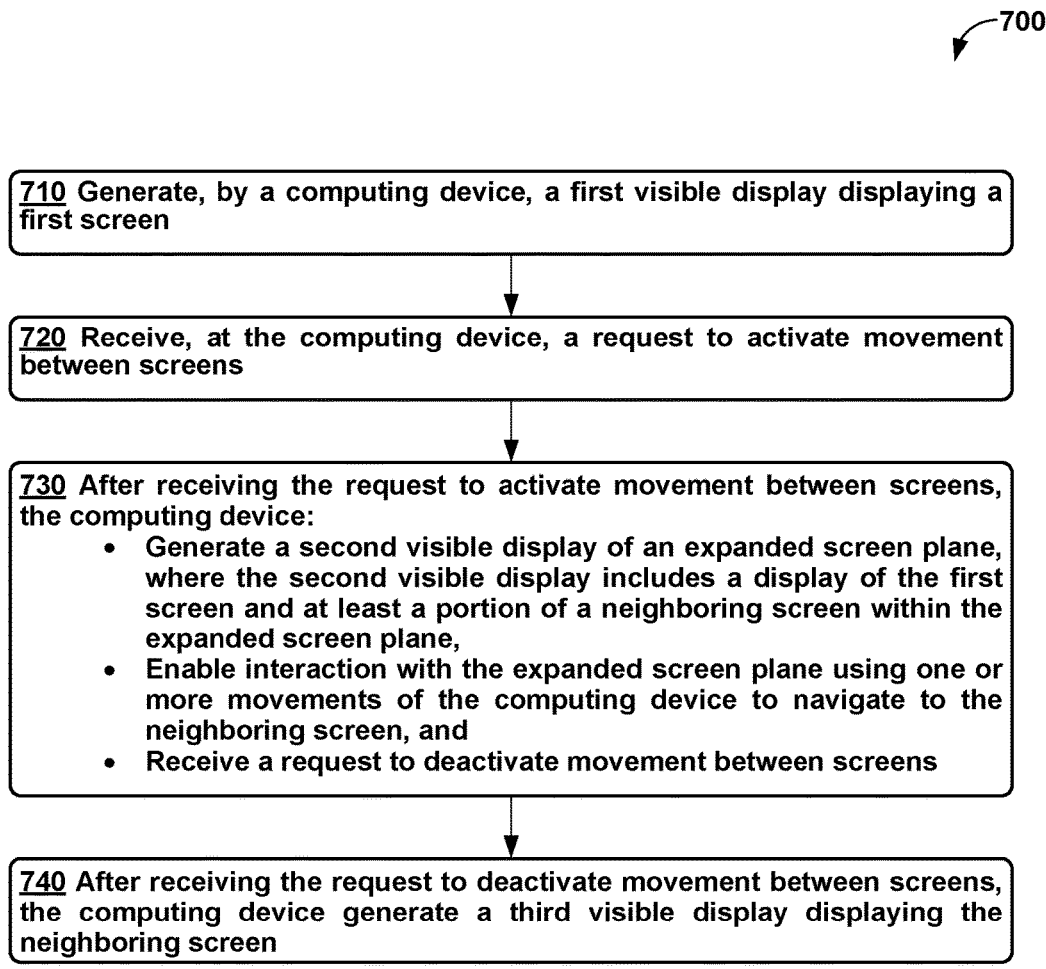
FIG. 7 is a flowchart of a method, in accordance with an example embodiment.

FIG. 7 is a flowchart of method 700, in accordance with an example embodiment. Method 700 can be executed by a server computing device, such as computing device 600. Method 700 can begin at block 710, where the computing device can generate a first visible display displaying a first screen, such as discussed above in at least the context of FIGS. 1 and 3A-3C.

At block 720, the computing device can receive a request to activate movement between screens, such as discussed above in at least the context of FIGS. 1 and 3A-3C.

In some embodiments, receiving the request to activate movement between screens can include: determining whether a hop navigation button of the computing device has been pressed; and based on determining that the hop navigation button of the computing device has been pressed, receiving the request to activate movement between screens, such as discussed above in at least the context of FIGS. 1 and 3A-3C.

At block 730, after receiving the request to activate movement between screens, the computing device can: generate a second visible display of an expanded screen plane, where the second visible display includes a display of the first screen and at least a portion of a neighboring screen within the expanded screen plane, enable interaction with the expanded screen plane using one or more movements of the computing device to navigate to the neighboring screen, and receiving a request to deactivate movement between screens, such as discussed above in at least the context of FIGS. 1 and 3A-3C.

In some embodiments, the one or more movements of the computing device can include at least one of: an upward tilt of the computing device, a downward tilt of the computing device, a left tilt of the computing device, and a right tilt of the computing device, such as discussed above in at least the context of FIGS. 2A-4C.

In other embodiments, receiving the request to deactivate movement between screens can include: determining whether the hop navigation button of the computing device has been released; and, based on determining that the hop navigation button of the computing device has been released, receiving the request to deactivate movement between screens, such as discussed above in at least the context of FIGS. 1 and 3A-3C.

In even other embodiments, the first screen can be associated with a first application, and the expanded screen plane can include a first plurality of screens associated with the first application, such as discussed above in at least the context of FIGS. 3A-4C. In particular of these embodiments, the first application can include a messaging application for conducting a first messaging session, such as discussed above in at least the context of FIGS. 4A-4C. In more particular of these embodiments, the first plurality of screens associated with the first application can include one or more of: a screen for a contact associated with the first messaging session and a screen associated with a messaging session held prior to the first messaging session, such as discussed above in at least the context of FIGS. 4A-4C.

In still other embodiments, the expanded screen plane can be associated with a plurality of applications, and the neighboring screen can be associated with a second application of the plurality of applications, such as discussed above in at least the context of FIGS. 3A-3C. In particular of these embodiments, the third visible display can include a display generated by the second application, such as discussed above in at least the context of FIGS. 3A-3C.

In yet other embodiments, the expanded screen plane can be associated with a second plurality of screens that include the first screen; then, enabling interaction with the expanded screen plane can include: receiving, at the computing device, an indication that the mobile device has been moved, where the indication includes a tilt direction; determining to display at least a particular screen of the second plurality of screens based on the tilt direction using the computing device; and displaying at least the particular screen using the computing device, such as discussed above in at least the context of FIGS. 2A-3C. In particular of these embodiments, the indication that the mobile device has been moved can further include a tilt angle; then determining to display at least the particular screen of the second plurality of screens based on the tilt direction can include determining to display at least the particular screen of the second plurality of screens based on the tilt direction comprises determining a speed of movement within the extended screen space, such as discussed above in at least the context of FIGS. 2A and 2B.

In yet even other embodiments, enabling interaction with the expanded screen plane can include providing haptic feedback in response to navigating to the neighboring screen, such as discussed above in at least the context of FIGS. 2A-3C. In particular of these embodiments, providing haptic feedback in response to navigating to the neighboring screen can include providing haptic feedback for each screen reached within the expanded screen plane while navigating from the first screen to the neighboring screen, such as discussed above in at least the context of FIGS. 3A-3C. In other particular of these embodiments, the neighboring screen can be associated with a third plurality of screens that include the first screen; then, providing haptic feedback in response to navigating to the neighboring screen can include: receiving, at the computing device, an indication that the mobile device has been moved, where the indication includes a tilt direction; determining to display at least a particular screen of the third plurality of screens based on the tilt direction using the computing device; and after displaying at least the particular screen, providing the haptic feedback using the computing device, such as discussed above in at least the context of FIGS. 3A-3C.

In further even other embodiments, enabling interaction with the expanded screen plane using one or more movements of the computing device to navigate to the neighboring screen can include: receiving, at the computing device, an indication that the mobile device has been moved, where the indication includes one or more tilt angles; determining one or more tilt directions based on the one or more tilt angles; and enabling interaction with the expanded screen plane based on the one or more tilt directions, such as discussed above in at least the context of FIGS. 2A and 2B. In particular of these embodiments, determining one or more tilt directions based on the one or more tilt angles can include: determining whether a tilt angle of the one or more tilt angles exceeds a threshold value associated with a particular tilt direction; and after determining that the tilt angle of the one or more tilt angles exceeds a threshold value associated with a particular tilt direction, determining that a tilt direction associated with the tilt angle includes the particular tilt direction, such as discussed above in at least the context of FIGS. 2A and 2B.

In more particular of these embodiments, determining one or more tilt directions based on the one or more tilt angles can include: after determining that the tilt angle of the one or more tilt angles does not exceed a threshold value associated with a particular tilt direction, determining whether the tilt angle exceeds a second threshold value associated with a second particular tilt direction; and after determining that the tilt angle exceeds the second threshold value associated with a second particular tilt direction, determining that a tilt direction associated with the tilt angle includes the second particular tilt direction, such as discussed above in at least the context of FIGS. 2A and 2B. In still more particular of these embodiments, determining one or more tilt directions based on the one or more tilt angles can include: after determining that the tilt angle does not exceed the second threshold value determining that a tilt direction associated with the tilt angle includes a no tilt, such as discussed above in at least the context of FIGS. 2A and 2B. In other particular of these embodiments, determining one or more tilt directions based on the one or more tilt angles can include: determining whether a tilt angle of the one or more tilt angles is within a range of tilt angle values associated with a particular tilt direction; and after determining that the tilt angle of the one or more tilt angles is within the range of tilt angle values associated with the particular tilt direction, determining that a tilt direction associated with the tilt angle includes the particular tilt direction, such as discussed above in at least the context of FIGS. 2A and 2B.

In still further even other embodiments, the computing device can include a front plane which has a horizontal axis; then, enabling interaction with the expanded screen plane using one or more movements of the computing device to navigate to the neighboring screen includes: determining a horizontally-associated tilt angle associated with the one or more movements involving the horizontal axis of the computing device; determining whether the horizontally-associated tilt angle is less than a first threshold value associated with a left tilt; and after determining that the horizontally-associated tilt angle is less than the first threshold value, navigating to a left neighboring screen that is left of the first screen within the expanded screen plane, such as discussed above in at least the context of FIGS. 2A and 2B. In particular of these embodiments, enabling interaction with the expanded screen plane using one or more movements of the computing device to navigate to the neighboring screen can further include: after determining that the horizontally-associated tilt angle is not less than the first threshold value, determining whether the horizontally-associated exceeds a second threshold value associated with a right tilt; and after determining that the horizontally-associated tilt angle exceeds the second threshold value, navigating to a right neighboring screen that is right of the first screen within the expanded screen plane, such as discussed above in at least the context of FIGS. 2A and 2B.

In yet further even other embodiments, the computing device can include a front plane having a vertical axis, and where enabling interaction with the expanded screen plane using one or more movements of the computing device to navigate to the neighboring screen can includes: determining a vertically-associated tilt angle associated with the one or more movements involving the vertical axis of the computing device; determining whether the vertically-associated tilt angle is less than a third threshold value associated with a downward tilt; and after determining that the vertically-associated tilt angle is less than the third threshold value, navigating to a downward neighboring screen that is downward of the first screen within the expanded screen plane, such as discussed above in at least the context of FIGS. 2A and 2B. In particular of these embodiments, enabling interaction with the expanded screen plane using one or more movements of the computing device to navigate to the neighboring screen can further include: after determining that the vertically-associated tilt angle is not less than the third threshold value, determining whether the vertically-associated exceeds a fourth threshold value associated with an upward tilt; and after determining that the vertically-associated tilt angle exceeds the fourth threshold value, navigating to a upward neighboring screen that is upward of the first screen within the expanded screen plane, such as discussed above in at least the context of FIGS. 2A and 2B.

At block 740, after receiving the request to deactivate movement between screens, the computing device can generate a third visible display displaying the neighboring screen, such as discussed above in at least the context of FIGS. 1 and 3A-3C.

Additional Example Embodiments

The following clauses are offered as further description of the disclosure.

Clause 1—A method, including: generating, by a computing device, a first visible display displaying a first screen; receiving, at the computing device, a request to activate movement between screens; after receiving the request to activate movement between screens, the computing device: generating a second visible display of an expanded screen plane, where the second visible display includes a display of the first screen and at least a portion of a neighboring screen within the expanded screen plane, enabling interaction with the expanded screen plane using one or more movements of the computing device to navigate to the neighboring screen, and receiving a request to deactivate movement between screens; and after receiving the request to deactivate movement between screens, the computing device generating a third visible display displaying the neighboring screen.

Clause 2—The method of Clause 1, where the one or more movements of the computing device include at least one of: an upward tilt of the computing device, a downward tilt of the computing device, a left tilt of the computing device, and a right tilt of the computing device.

Clause 3—The method of either Clause 1 or Clause 2, where receiving the request to activate movement between screens includes: determining whether a hop navigation button of the computing device has been pressed; and based on determining that the hop navigation button of the computing device has been pressed, receiving the request to activate movement between screens.

Clause 4—The method of Clause 3, where receiving the request to deactivate movement between screens includes: determining whether the hop navigation button of the computing device has been released; and based on determining that the hop navigation button of the computing device has been released, receiving the request to deactivate movement between screens.

Clause 5—The method of any one of Clauses 1-4, where the first screen is associated with a first application, and where the expanded screen plane includes a first plurality of screens associated with the first application.

Clause 6—The method of Clause 5, where the first application includes a messaging application for conducting a first messaging session.

Clause 7—The method of Clause 6, where the first plurality of screens associated with the first application include one or more of: a screen for a contact associated with the first messaging session and a screen associated with a messaging session held prior to the first messaging session.

Clause 8—The method of any one of Clauses 1-7, where the expanded screen plane is associated with a plurality of applications, and where the neighboring screen is associated with a second application of the plurality of applications.

Clause 9—The method of Clause 8, where the third visible display includes a display generated by the second application.

Clause 10—The method of any one of Clauses 1-9, where the expanded screen plane is associated with a second plurality of screens that include the first screen, and where enabling interaction with the expanded screen plane includes: receiving, at the computing device, an indication that the mobile device has been moved, where the indication includes a tilt direction; determining to display at least a particular screen of the second plurality of screens based on the tilt direction using the computing device; and displaying at least the particular screen using the computing device.

Clause 11—The method of Clause 10, where the indication that the mobile device has been moved further includes a tilt angle, and where determining to display at least the particular screen of the second plurality of screens based on the tilt direction includes determining to display at least the particular screen of the second plurality of screens based on the tilt direction comprises determining a speed of movement within the extended screen space.

Clause 12—The method of any one of Clauses 1-9, where enabling interaction with the expanded screen plane includes providing haptic feedback in response to navigating to the neighboring screen.

Clause 13—The method of Clause 12, where providing haptic feedback in response to navigating to the neighboring screen includes providing haptic feedback for each screen reached within the expanded screen plane while navigating from the first screen to the neighboring screen.

Clause 14—The method of Clause 12 or Clause 13, where the neighboring screen is associated with a third plurality of screens that include the first screen, and where providing haptic feedback in response to navigating to the neighboring screen includes: receiving, at the computing device, an indication that the mobile device has been moved, where the indication includes a tilt direction; determining to display at least a particular screen of the third plurality of screens based on the tilt direction using the computing device; and after displaying at least the particular screen, providing the haptic feedback using the computing device.

Clause 15—The method of any one of Clauses 1-14, where enabling interaction with the expanded screen plane using one or more movements of the computing device to navigate to the neighboring screen includes: receiving, at the computing device, an indication that the mobile device has been moved, where the indication includes one or more tilt angles; determining one or more tilt directions based on the one or more tilt angles; and enabling interaction with the expanded screen plane based on the one or more tilt directions.

Clause 16—The method of Clause 15, where determining one or more tilt directions based on the one or more tilt angles includes: determining whether a tilt angle of the one or more tilt angles exceeds a threshold value associated with a particular tilt direction; and after determining that the tilt angle of the one or more tilt angles exceeds a threshold value associated with a particular tilt direction, determining that a tilt direction associated with the tilt angle includes the particular tilt direction.

Clause 17—The method of Clause 16, where determining one or more tilt directions based on the one or more tilt angles includes: after determining that the tilt angle of the one or more tilt angles does not exceed a threshold value associated with a particular tilt direction, determining whether the tilt angle exceeds a second threshold value associated with a second particular tilt direction; and after determining that the tilt angle exceeds the second threshold value associated with a second particular tilt direction, determining that a tilt direction associated with the tilt angle includes the second particular tilt direction.

Clause 18—The method of Clause 17, where determining one or more tilt directions based on the one or more tilt angles includes: after determining that the tilt angle does not exceed the second threshold value determining that a tilt direction associated with the tilt angle includes a no tilt.

Clause 19—The method of any one of Clauses 15-18, where determining one or more tilt directions based on the one or more tilt angles includes: determining whether a tilt angle of the one or more tilt angles is within a range of tilt angle values associated with a particular tilt direction; and after determining that the tilt angle of the one or more tilt angles is within the range of tilt angle values associated with the particular tilt direction, determining that a tilt direction associated with the tilt angle includes the particular tilt direction.

Clause 20—The method of any one of Clauses 1-19, where the computing device includes a front plane having a horizontal axis, and where enabling interaction with the expanded screen plane using one or more movements of the computing device to navigate to the neighboring screen includes: determining a horizontally-associated tilt angle associated with the one or more movements involving the horizontal axis of the computing device; determining whether the horizontally-associated tilt angle is less than a first threshold value associated with a left tilt; and after determining that the horizontally-associated tilt angle is less than the first threshold value, navigating to a left neighboring screen that is left of the first screen within the expanded screen plane.

Clause 21—The method of Clause 20, where enabling interaction with the expanded screen plane using one or more movements of the computing device to navigate to the neighboring screen further includes: after determining that the horizontally-associated tilt angle is not less than the first threshold value, determining whether the horizontally-associated exceeds a second threshold value associated with a right tilt; and after determining that the horizontally-associated tilt angle exceeds the second threshold value, navigating to a right neighboring screen that is right of the first screen within the expanded screen plane.

Clause 22—The method of any one of Clauses 1-21, where the computing device includes a front plane having a vertical axis, and where enabling interaction with the expanded screen plane using one or more movements of the computing device to navigate to the neighboring screen includes: determining a vertically-associated tilt angle associated with the one or more movements involving the vertical axis of the computing device; determining whether the vertically-associated tilt angle is less than a third threshold value associated with a downward tilt; and after determining that the vertically-associated tilt angle is less than the third threshold value, navigating to a downward neighboring screen that is downward of the first screen within the expanded screen plane.

Clause 23—The method of Clause 22, where enabling interaction with the expanded screen plane using one or more movements of the computing device to navigate to the neighboring screen further includes: after determining that the vertically-associated tilt angle is not less than the third threshold value, determining whether the vertically-associated exceeds a fourth threshold value associated with an upward tilt; and after determining that the vertically-associated tilt angle exceeds the fourth threshold value, navigating to a upward neighboring screen that is upward of the first screen within the expanded screen plane.

Clause 24—A computing device, including: one or more processors; and data storage including at least computer-executable instructions stored thereon that, when executed by the one or more processors, cause the computing device to perform functions including the method of any one of Clauses 1-23.

Clause 25—A computer readable medium having stored thereon instructions, that when executed by one or more processors of a computing device, cause the computing device to perform functions including the method of any one of Clauses 1-23.

Clause 26—The computer readable medium of Clause 25, where the computer readable medium includes a non-transitory computer readable medium.

Clause 27—An apparatus, including: means for performing the method of any one of Clauses 1-23.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:
1. A method, comprising:
generating, by a computing device, a first visible display displaying a first screen;
receiving, at the computing device, a request to activate movement between screens;
after receiving the request to activate movement between screens, the computing device:
generating a second visible display of an expanded screen plane, wherein the second visible display comprises a display of the first screen and at least a portion of a neighboring screen within the expanded screen plane, and wherein the expanded screen plane is associated with a first plurality of screens that comprise the first screen,
enabling interaction with the expanded screen plane using one or more movements of the computing device to navigate to the neighboring screen by at least:
receiving an indication that the computing device has been moved, wherein the indication comprises a particular tilt angle, and
and enabling interaction with the expanded screen plane based on the particular tilt angle by:
    determining a speed of movement within the expanded screen plane based on the particular tilt angle, and
    determining to display at least a particular screen of the first plurality of screens based on the speed of movement, and
receiving a request to deactivate movement between screens; and
after receiving the request to deactivate movement between screens, the computing device generating a third visible display displaying the neighboring screen.

2. The method of claim 1, wherein the one or more movements of the computing device include at least one of: an upward tilt of the computing device, a downward tilt of the computing device, a left tilt of the computing device, and a right tilt of the computing device.

3. The method of claim 1, wherein receiving the request to activate movement between screens comprises:
    determining whether a hop navigation button of the computing device has been pressed;
    based on determining that the hop navigation button of the computing device has been pressed, receiving the request to activate movement between screens;
    determining whether the hop navigation button of the computing device has been released; and
    based on determining that the hop navigation button of the computing device has been released, receiving the request to deactivate movement between screens.

4. The method of claim 1, wherein the first screen is associated with a first application, and wherein the expanded screen plane comprises a second plurality of screens associated with the first application.

5. The method of claim 4, wherein the first application comprises a messaging application for conducting a first messaging session, and wherein the second plurality of screens associated with the first application comprise one or more of: a screen for a contact associated with the first messaging session and a screen associated with a messaging session held prior to the first messaging session.

6. The method of claim 1, wherein the expanded screen plane is associated with a plurality of applications, wherein the neighboring screen is associated with a second application of the plurality of applications, and wherein the third visible display comprises a display generated by the second application.

7. The method of claim 1,
    wherein enabling interaction with the expanded screen plane based on the particular tilt angle comprises:
        determining a particular tilt direction associated with the particular tilt angle; and
        determining a direction of movement within the expanded screen plane based on the particular tilt direction.

8. The method of claim 1, wherein enabling interaction with the expanded screen plane comprises providing haptic feedback in response to navigating to the neighboring screen, and wherein providing haptic feedback in response to navigating to the neighboring screen comprises providing haptic feedback for each screen reached within the expanded screen plane while navigating from the first screen to the neighboring screen.

9. The method of claim 8, wherein the neighboring screen is associated with a third plurality of screens that comprise the first screen, and wherein providing haptic feedback in response to navigating to the neighboring screen further comprises:
    receiving, at the computing device, an indication that the computing device has been moved, wherein the indication comprises a tilt direction;
    determining to display at least a particular screen of the third plurality of screens based on the tilt direction using the computing device; and
    after displaying at least the particular screen, providing the haptic feedback using the computing device.

10. The method of claim 1, wherein generating the second visible display of the expanded screen plane comprises generating a display of a reduced view of the first screen within the expanded screen plane.

11. The method of claim 1, wherein enabling interaction with the expanded screen plane based on the particular tilt angle further comprises:
    determining whether the particular tilt angle exceeds a threshold value associated with a particular tilt direction; and
    after determining that the particular tilt angle exceeds a threshold value associated with a particular tilt direction, determining that a tilt direction associated with the particular tilt angle comprises the particular tilt direction.

12. The method of claim 11, wherein enabling interaction with the expanded screen plane based on the particular tilt angle further comprises:
    after determining that the particular tilt angle does not exceed a threshold value associated with a particular tilt direction, determining whether the particular tilt angle exceeds a second threshold value associated with a second particular tilt direction; and
    after determining that the particular tilt angle exceeds the second threshold value associated with a second particular tilt direction, determining that a tilt direction associated with the particular tilt angle comprises the second particular tilt direction.

13. The method of claim 12, wherein enabling interaction with the expanded screen plane based on the particular tilt angle further comprises:
    after determining that the particular tilt angle does not exceed the second threshold value determining that a tilt direction associated with the particular tilt angle comprises a no tilt.

14. The method of claim 1, wherein enabling interaction with the expanded screen plane based on the particular tilt angle further comprises:
    determining whether the particular tilt angle is within a range of tilt angle values associated with a particular tilt direction; and
    after determining that the particular tilt angle is within the range of tilt angle values associated with the particular tilt direction, determining that a tilt direction associated with the particular tilt angle comprises the particular tilt direction.

15. The method of claim 1, wherein the computing device comprises a front plane having a horizontal axis, and wherein enabling interaction with the expanded screen plane using one or more movements of the computing device to navigate to the neighboring screen comprises:
    determining a horizontally-associated tilt angle associated with the one or more movements involving the horizontal axis of the computing device;

determining whether the horizontally-associated tilt angle is less than a first threshold value associated with a left tilt; and after determining that the horizontally-associated tilt angle is less than the first threshold value, navigating to a left neighboring screen that is left of the first screen within the expanded screen plane.

16. The method of claim 15, wherein enabling interaction with the expanded screen plane using one or more movements of the computing device to navigate to the neighboring screen further comprises:

after determining that the horizontally-associated tilt angle is not less than the first threshold value, determining whether the horizontally-associated exceeds a second threshold value associated with a right tilt; and after determining that the horizontally-associated tilt angle exceeds the second threshold value, navigating to a right neighboring screen that is right of the first screen within the expanded screen plane.

17. The method of claim 1, wherein the computing device comprises a front plane having a vertical axis, and wherein enabling interaction with the expanded screen plane using one or more movements of the computing device to navigate to the neighboring screen comprises:

determining a vertically-associated tilt angle associated with the one or more movements involving the vertical axis of the computing device;

determining whether the vertically-associated tilt angle is less than a third threshold value associated with a downward tilt; and after determining that the vertically-associated tilt angle is less than the third threshold value, navigating to a downward neighboring screen that is downward of the first screen within the expanded screen plane.

18. The method of claim 17, wherein enabling interaction with the expanded screen plane using one or more movements of the computing device to navigate to the neighboring screen further comprises:

after determining that the vertically-associated tilt angle is not less than the third threshold value, determining whether the vertically-associated exceeds a fourth threshold value associated with an upward tilt; and after determining that the vertically-associated tilt angle exceeds the fourth threshold value, navigating to an upward neighboring screen that is upward of the first screen within the expanded screen plane.

19. A computing device, comprising:
one or more processors; and
data storage including at least computer-executable instructions stored thereon that, when executed by the one or more processors, cause the computing device to perform functions comprising:
generating a first visible display displaying a first screen;
receiving a request to activate movement between screens;
after receiving the request to activate movement between screens:
generating a second visible display of an expanded screen plane, wherein the second visible display comprises a display of the first screen and at least a portion of a neighboring screen within the expanded screen plane, and wherein the expanded screen plane is associated with a first plurality of screens that comprise the first screen and the neighboring screen,
enabling interaction with the expanded screen plane using one or more movements of the computing device to navigate to the neighboring screen by at least:
receiving an indication that the computing device has been moved, wherein the indication comprises a particular tilt angle, and
enabling interaction with the expanded screen plane based on the particular tilt angle by:
determining a speed of movement within the expanded screen plane based on the particular tilt angle, and
determining to display at least a particular screen of the first plurality of screens based on the speed of movement, and
receiving a request to deactivate movement between screens; and
after receiving the request to deactivate movement between screens, generating a third visible display displaying the neighboring screen.

20. A non-transitory computer readable medium having stored thereon instructions, that when executed by one or more processors of a computing device, cause the computing device to perform functions comprising:
generating a first visible display displaying a first screen;
receiving a request to activate movement between screens;
after receiving the request to activate movement between screens:
generating a second visible display of an expanded screen plane, wherein the second visible display comprises a display of the first screen and at least a portion of a neighboring screen within the expanded screen plane, and wherein the expanded screen plane is associated with a first plurality of screens that comprise the first screen and the neighboring screen,
enabling interaction with the expanded screen plane using one or more movements of the computing device to navigate to the neighboring screen by at least:
receiving an indication that the computing device has been moved, wherein the indication comprises a particular tilt angle, and
enabling interaction with the expanded screen plane based on the particular tilt angle by:
determining a speed of movement within the expanded screen plane based on the particular tilt angle, and
determining to display at least a particular screen of the first plurality of screens based on the speed of movement, and
receiving a request to deactivate movement between screens; and
after receiving the request to deactivate movement between screens, generating a third visible display displaying the neighboring screen.

* * * * *